United States Patent
Furtwangler

(10) Patent No.: US 10,972,522 B2
(45) Date of Patent: *Apr. 6, 2021

(54) STREAMING MEDIA STATE MACHINE

(71) Applicant: Home Box Office, Inc., New York, NY (US)

(72) Inventor: Brandon C. Furtwangler, Issaquah, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,877

(22) Filed: Jan. 27, 2020

(65) Prior Publication Data

US 2020/0162530 A1    May 21, 2020

Related U.S. Application Data

(63) Continuation of application No. 15/135,783, filed on Apr. 22, 2016, now Pat. No. 10,581,943.

(51) Int. Cl.
*H04L 29/06* (2006.01)
*H04N 21/258* (2011.01)
(Continued)

(52) U.S. Cl.
CPC ......... *H04L 65/4092* (2013.01); *G06N 7/005* (2013.01); *H04L 45/24* (2013.01);
(Continued)

(58) Field of Classification Search
CPC ..... G06N 7/005; H04L 45/24; H04L 65/4092; H04L 65/602; H04L 65/80; H04N 21/25883; H04N 21/25891; H04N 21/26258; H04N 21/2668; H04N 21/4331; H04N 21/44004; H04N 21/8456
See application file for complete search history.

(56) References Cited

U.S. PATENT DOCUMENTS 9,244,678 B1 *   1/2016   Hatch ................... G11B 27/105
9,602,619 B1 *   3/2017   Eldawy ............... H04L 67/2847
(Continued)

FOREIGN PATENT DOCUMENTS

RU        2577460 C1    3/2016

OTHER PUBLICATIONS

US 5,128,712 A, 10/2000, Hunt et al. (withdrawn)
(Continued)

*Primary Examiner* — Gil H. Lee
(74) *Attorney, Agent, or Firm* — Amin, Turocy & Watson, LLP

(57) ABSTRACT

The described technology is directed towards having multiple paths through streamed media content, such as a video. The content may be represented as a state machine of states, in which each state corresponds to one or more periods of one or more segments, and transitions to one or more other states. When a state is able to transition to different states, one or more criteria may be used to select one of the transition paths to a next state. Segments corresponding to unknown paths (where the transition decision is not yet available) may be selected and streamed for buffering via a multiple path buffering mechanism.

20 Claims, 15 Drawing Sheets

(51) Int. Cl.

| | |
|---|---|
| *H04N 21/845* | (2011.01) |
| *H04N 21/2668* | (2011.01) |
| *H04N 21/262* | (2011.01) |
| *H04N 21/433* | (2011.01) |
| *G06N 7/00* | (2006.01) |
| *H04L 12/707* | (2013.01) |
| *H04N 21/44* | (2011.01) |

(52) U.S. Cl.
CPC ............ *H04L 65/602* (2013.01); *H04L 65/80* (2013.01); *H04N 21/25883* (2013.01); *H04N 21/25891* (2013.01); *H04N 21/2668* (2013.01); *H04N 21/26258* (2013.01); *H04N 21/4331* (2013.01); *H04N 21/8456* (2013.01); *H04N 21/44004* (2013.01)

(56) References Cited

U.S. PATENT DOCUMENTS

| | | | | |
|---|---|---|---|---|
| 9,849,384 | B1* | 12/2017 | Energin | A63F 13/5252 |
| 2002/0001455 | A1* | 1/2002 | Kashiwagi | H04N 13/161 |
| | | | | 386/241 |
| 2003/0179216 | A1 | 9/2003 | Blume | |
| 2003/0195977 | A1 | 10/2003 | Liu et al. | |
| 2012/0151539 | A1* | 6/2012 | Funge | H04N 21/23406 |
| | | | | 725/109 |
| 2013/0259442 | A1 | 10/2013 | Bloch et al. | |
| 2014/0082666 | A1* | 3/2014 | Bloch | H04N 21/8456 |
| | | | | 725/37 |
| 2014/0380167 | A1* | 12/2014 | Bloch | H04N 21/47205 |
| | | | | 715/723 |
| 2017/0201779 | A1* | 7/2017 | Publicover | G06Q 30/0251 |

OTHER PUBLICATIONS

Office Action received for Colombian Patent Application Serial No. 2018/0011281 dated Jan. 22, 2020, 22 pages.
Office Action received for Chinese Patent Application Serial No. 201790000865.5 dated Apr. 3, 2019, 4 pages including English Translation.
Office Action received for EP Patent Application Serial No. 17721926.8-1208 dated Nov. 29, 2018, 3 pages including English Translation.
International Search Report and Written Opinion dated Jun. 19, 2017 for PCT Application Serial No. PCT/US2017/028900, 15 pages.
Non-Final Office Action received for U.S. Appl. No. 15/135,783 dated Oct. 17, 2018, 26 pages.
Final Office Action received for U.S. Appl. No. 15/135,783 dated Feb. 25, 2019, 22 pages.
Non-Final Office Action received for U.S. Appl. No. 15/135,783 dated Jul. 5, 2019, 24 pages.
First Office Action received for Chinese Patent Application Serial No. 201790000865.5 dated Apr. 3, 2019, 4 pages (Including English Translation).
Notice of Allowance received for U.S. Appl. No. 15/135,783 dated Oct. 23, 2019, 28 pages.
Communication pursuant to Article 94(3) EPC for European Application No. 17 721 926.8-1208 dated Apr. 29, 2020, 1 pages.
U.S. Appl. No. 15/135,783, filed Apr. 22, 2016.

* cited by examiner

```
Node ID = A
Edge1 = PTR to B1                                    331
Edge2 = PTR to B2
Rule = If viewer local time < 12:00 pm OR
       day of week = Saturday or Sunday OR
       holiday flag set then B1
       Else B2
Segment Set = (S1 ... S25)
```

```
Node ID = B1
Edge1 = PTR to B1
Edge2 = PTR to C1                                    332
Edge3 = PTR to C2
Rule = If viewer input = Yes then C1
       If viewer input = No then C2
       Else Loop B1
Segment Set = (S26 ... S41)
```

```
Node ID = B2
Edge1 = PTR to B2
Edge2 = PTR to C2                                    333
Edge3 = PTR to C3
Rule = If viewer input = Yes then C3
       If viewer input = No then C2
       Else Loop B2
Segment Set = (S42 ... S68)
```

```
Node ID = C1
Edge1 = PTR to D                                     334
Segment Set = (S69 ... S1685)
```

```
Node ID = C2
Edge1 = PTR to D                                     335
Segment Set = (S1686 ... S2639)
```

```
Node ID = C3
Edge1 = PTR to D                                     336
Segment Set = (S2511 ... S3691)
```

```
Node ID = D
Edge1 = PTR to E                                     337
Segment Set = (S3692 ... S4100)
```

```
Node ID = E                                          338
Segment Set = (S14101 ... S14130, S14320 ... S14328)
```

STREAMING MEDIA STATE MACHINE

CROSS-REFERENCE TO RELATED APPLICATION

This application is a continuation of and claims priority to co-pending U.S. patent application Ser. No. 15/135,783, filed on Apr. 22, 2016, entitled "STREAMING MEDIA STATE MACHINE". The entirety of the aforementioned application is hereby incorporated by reference herein.

BACKGROUND

Streaming media (including but not limited to video and/or audio), in which content delivery networks stream media to clients, has become very popular. In general, streaming media comprises a linear sequence of segmented content transmitted to a client device. The segments are typically on the order of a few seconds of data that are each transmitted to the client device, buffered at the client device and played from the buffer. In this way, a client device can begin playing content such as a video before the entire video is downloaded, or even as live video is being captured.

For some streaming media, a viewer can choose the quality (e.g., the resolution of the video) that is streamed. For example, this allows some users with a high-bandwidth connection to view high quality (e.g., high definition) video, whereas users with a lower-bandwidth connection, lower resolution device and/or limited data plan can view the streaming video with less data transfer involved. This can be automatically set up by a user and/or predetermined for a given connection.

Another way in which video (including audio) may be streamed is adaptive bitrate streaming, which dynamically adapts the video quality to try and provide the highest quality video without allowing the buffer to become depleted. To this end, a video encoder can encode, for example, three separate adaptations for each video segment, such as high, medium and low quality adaptations corresponding to fast, medium and slow client bitrates. If the client's buffer is becoming depleted, rather than pause the video to refill the buffer once the buffer becomes empty, one or more lower quality segments are streamed to keep the buffered data ahead of the current video position (if not already sending the lowest quality segments). Conversely, higher quality segments may be streamed as the buffer starts to fill up, up to the highest quality available. The general tradeoff with adaptive bitrate streaming is that the viewer does not have to wait somewhere in the middle of viewing a video as the next set of data gets buffered, however the viewer may detect varying video quality.

While these concepts provide some benefits and advantages in viewing streaming video, streaming video is still linear in nature.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein provides for having multiple paths through streamed content such as a video. Aspects are directed towards streaming content having different content paths through the content to different clients, including having a plurality of transition paths from one content period (e.g., a contiguous and linear arrangement of segments in time) to a plurality of next content periods. Criteria may be used to determine which transition path to a next content period to select as a selected next content period for a client, such that segments are transmitted from the one content period and the selected next content period to the client. The content may be represented as a state machine of states (corresponding to periods of one or more segments) and transitions to other states.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which:

FIG. 3 is an example of how nodes and data in the nodes may be arranged and used to represent the states and transitions (transition rules) of the example media state machine of FIG. 2, according to one or more example implementations.

DETAILED DESCRIPTION

Figure 1:
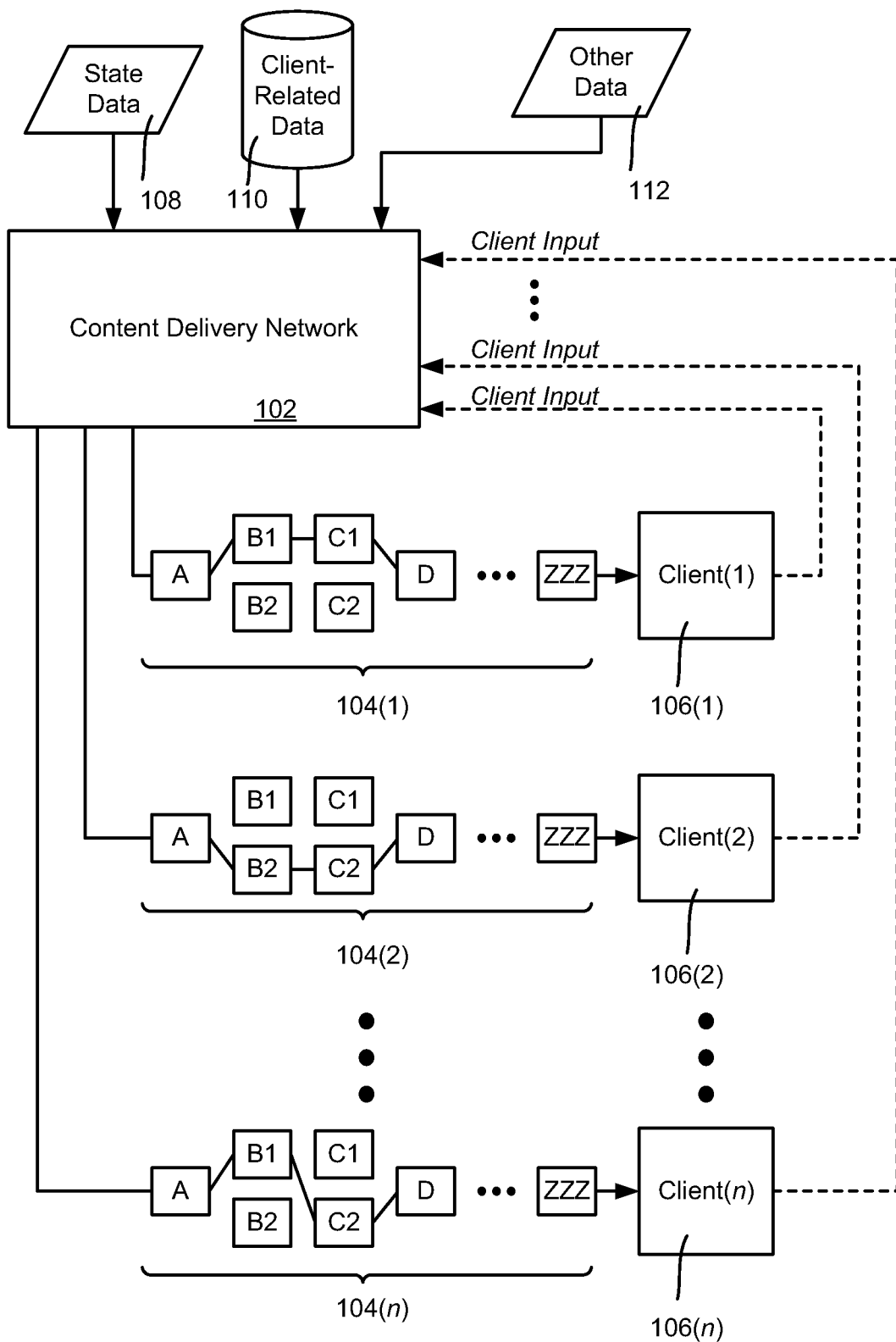
FIG. 1 is an example block diagram representation of transmitting different content segments corresponding to different paths through the same content to different clients, according to one or more example implementations.

Various aspects of the technology described herein are generally directed towards non-linear streaming media, in which different content paths in the media may be predefined and/or selected for streaming to different clients. For example, with respect to the same general piece of content such as a video, one client may receive video segments [A, B, C, D1, E] while another client receives video segments [A, B, C, D2, E]. As one straightforward example, one viewer may receive a content period path including the PG-rated version of a scene (that includes segment D1) while another viewer receives another content segment path including the R-rated version of a similar, but different scene (that includes segment D2) for playing the video.

In general, as used herein, "streaming media" and/or "content" generally refers to audio and/or video data, (although it also may include concepts such as streamed text, closed captioning, ticker tape such as stock quotes, sports results and the like, and so on). The term "segment" refers to some portion of media content, typically (but not limited to) on the order of two to ten seconds each; notwithstanding a segment may correspond to any amount of time, including as small as a single frame (or possibly a sub-frame) of media. Note however that compression techniques may influence the segment lengths; e.g., segments may be bounded by I-frame boundaries and so on. A period of segments (or simply "period") comprises a contiguous and linear arrangement of one or more segments in time; e.g., a particular scene in a movie or television show may correspond to a period. A "path" refers to which periods are streamed to a given client; non-linear content as described herein has more than one path between the start and end. It should be further noted that in one or more implementations, the technology described herein is independent of any digital rights management (DRM), media containers and/or encoding/decoding (CODECs), (except to the extent that compression may influence segment boundaries and the technology described herein may use already-encoded segments).

Thus, the technology described herein allows for varying the content played by clients via different content segments for different clients (in contrast to adaptive bitrate streaming which does not vary the content path, only the segment quality of the same content). Further, the same client may have the same piece of content played differently at different content-playing sessions. As will be understood, the content segments that a client receives for playing may be varied based upon any number of conditions corresponding to one or more criterion being met or not met.

As will be understood, one way that streaming different content paths to different clients and/or to the same client at different times may be accomplished is to represent content as a media state machine, e.g., video content (typically including accompanying audio) may be represented as a video state machine; (or for audio only, as an audio state machine). The states (or graph nodes) represent sets of one or more segments that are stitched together to form the video. The transitions (or graph edges) each represent a possible path from one period of segments to a next period of segments.

In one or more implementations, for a video for example, the periods and transitions are arranged (e.g., by the content provider) so that a viewer, regardless of any given path taken through the various possible states, generally considers the streamed content as a unified video presentation. Indeed, the viewer may have no idea that different paths were selected for streaming the video, (although a viewer that views the same video multiple times may recognize that there can be differences between viewing sessions). Also, viewer (or listener) interaction to select between alternative possible paths may be made available, as described herein.

As with the transitions conditions of other of state machines, virtually any criterion or criteria may be used to select a content path or set of content paths within streamed media content. Some non-limiting examples may include client-related criteria data such as maximum allowed rating for each viewer, per-client preference data, client device type, location of the client device, past per-client history, past history of other clients, whether the client device is moving, client profile data/category of client viewer (e.g., age group, zip code and so on if known), and/or the like. How content is selected by a viewer for streaming may be considered, e.g., whether a movie that is both an action movie and a comedy was selected via a "Comedy" genre sub-menu or an "Action" genre sub-menu may be used as a criterion in selecting a conditional period path.

Selection criterion or criteria also may include various state data. Non-limiting examples may include time of day, day of week, holiday, season, climate data, and/or the like. For example, a transition condition may specify to select a certain period path if before noon, and a different period path if after noon.

Random selection may be used to choose a path or set of paths for streamed content. Weighting for random selection may be used, with weights possibly based upon some known criterion or criteria, e.g., eighty percent of female viewers get period T1 and twenty percent get period T2, with male or unspecified sex viewers split fifty-fifty between periods T1 and T2.

Live streamed media also may be subject to different criteria-based paths. For example, when viewing a live boxing match, one viewer may choose to view the match from an overhead camera, while another viewer may choose to view the match according to the director's chosen camera. This may be changed via dynamic user input, or possibly via other criteria, e.g., show the first four rounds from overhead, and the remaining rounds from the director's chosen camera. Live viewing (or almost live viewing within a time window) versus replay may be used as a transition path selection criterion.

Still further, user input may be used to select among alternate paths or sets of paths within streamed content. For example, a client user may indicate that he or she wants to view a scene captured by an overhead camera whenever such an alternate camera angle exists, regardless of the director's preferred camera angle. Such a preference may be specified in advance, such as during user selection of a video. Alternatively (or in addition to), a client user may interact during the streaming such as to request a particular path, e.g., show one alternative (e.g., happy ending) path instead of another path, (e.g., tragic ending). Thus, some user input may be received and thus known ahead of time for path selection, whereas other user input may be dynamically received and used to select a path.

It should also be noted that other user input may indirectly change the content path. For example, consider a scenario in which a video path that is chosen depends on the time of day (and/or some other variable data such as outside temperature) at the moment the transition decision is to be made (as opposed to the time when a video is started). Although the decision may be estimated from the video's starting time, user input that pauses, fast forwards or rewinds the media may change the time as to when the actual transition decision is reached, and thus any estimated decision may need to be updated, possibly multiple times, or simply no decision made until the actual transition decision time is reached.

As yet another example of suitable criteria for path selection, social media including live social media may be monitored and used to select one piece of content over another. For example, consider that social media indicates that with respect to a video, people seem very interested in a particular topic and/or character (what the King will ultimately decide) and less interested in another topic and/or character (some minor character's actions). The social media may be used to select one path over another for at least one viewer, e.g., to provide for a "cliffhanger" scene that is not resolved until a later scene (rather than right away), and indeed which possibly may be deferred until a next episode. Alternatively, a scene corresponding to something in which viewers are expressing interest may be shown sooner rather than later to keep viewers from turning off a video. Survey data and the like may also be used as criteria to decide on a path.

It should be understood that any of the examples herein are non-limiting. For instance, some of the examples refer to a video streaming service that delivers movies, television shows, documentaries, homemade videos and so forth, as well as possibly including third party advertising. Indeed, as used herein, "video" also includes all types of video, e.g., three-dimensional, two-dimensional, virtual reality video and so forth; "video" also includes any accompanying audio as well. However, the technology described herein is independent of any particular type of media data being returned, and for example may include audio with or without video, as well as any other type of data that may be transmitted and output to be sensed alone or in conjunction with other content, including tactile output such as vibrations. As another example, various possible selection criteria are described herein, however these are only non-limiting examples, and any suitable criterion or criteria (including unambiguous data, fuzzy logic, pseudo-random data, random data, user input, crowd input, and so on including any combination thereof) may be used to make a path selection decision. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in streaming media delivery and content processing in general.

FIG. 1 is a block diagram representing example components that may be used to provide streamed video with alternate paths among sets of video segments. A content delivery network 102 (sometimes referred to as a content distribution network) streams media 104(1)-104(n) to clients 106(1)-106(n), respectively. As generally represented in FIG. 1, each client may receive different segments (or different periods) for the same streamed media. For example, in which lines connecting segments indicate paths through the media content, client 106(1) receives periods [A, B1, C1, D, . . . zzz], client 106(2) receives periods [A, B2, C2, D, . . . zzz] and client 106(n) receives periods [A, B1, C2, D, . . . , zzz].

As set forth in the non-limiting examples herein, state data 108 and client-related data 110 may be used in selecting which clients get which combination of segments/periods. Other data 112 (e.g., social media activity) may be used as criteria related to path selection.

Thus, for example, based upon the state data 108, the client 106(1) may receive segment B1 because the client 106(1) was viewing a video in the morning, whereas the client 106(2) may receive segment B2 because the client 106(2) was viewing the same video in the afternoon. Based upon the client-related data 110, for example, the client 106(2) and the client 106(n) may each receive segment C2 because they are both viewing though cable television set top boxes whereas the client 106(1) is watching over an internet connection and gets period C1.

Also shown in FIG. 1 is client input being fed back to the content delivery network 102. This allows a client user (and/or a device process) to interact at any time, e.g., before viewing streamed video or during viewing, as well as afterwards. For instance, before selection of a video and/or during the selection process in which the client user chooses the video, the client user may indicate a desire to view the video with an emphasis on some perspective. As a more particularly example, in a movie in which invaders attack a castle, a viewer may be given a choice to view a scene from the attacker's viewpoint or from the defenders' viewpoint (one of which may be the default if no choice is made), with each choice corresponding to an alternate path. This may be chosen beforehand, and/or during viewing, such as during an intermission/pause or via overlaid text or the like during playback, client users may be given an opportunity to interact to make some decision that determines a future path. After viewing a video, a client user may also enter information that is used for some later viewing, e.g., if the video is replayed the playback may use the other path next time.

Historical information such as the client always choosing the defenders' viewpoint may be used for a similar scene in a next episode. Also note that client input may be indirect, e.g., in the set-top box versus internet example above, such criterion may be considered indirect client input (e.g., obtained at the connection time) rather than client-related data 110; indeed, there may be no distinct line between various types of criteria).

Figure 2:
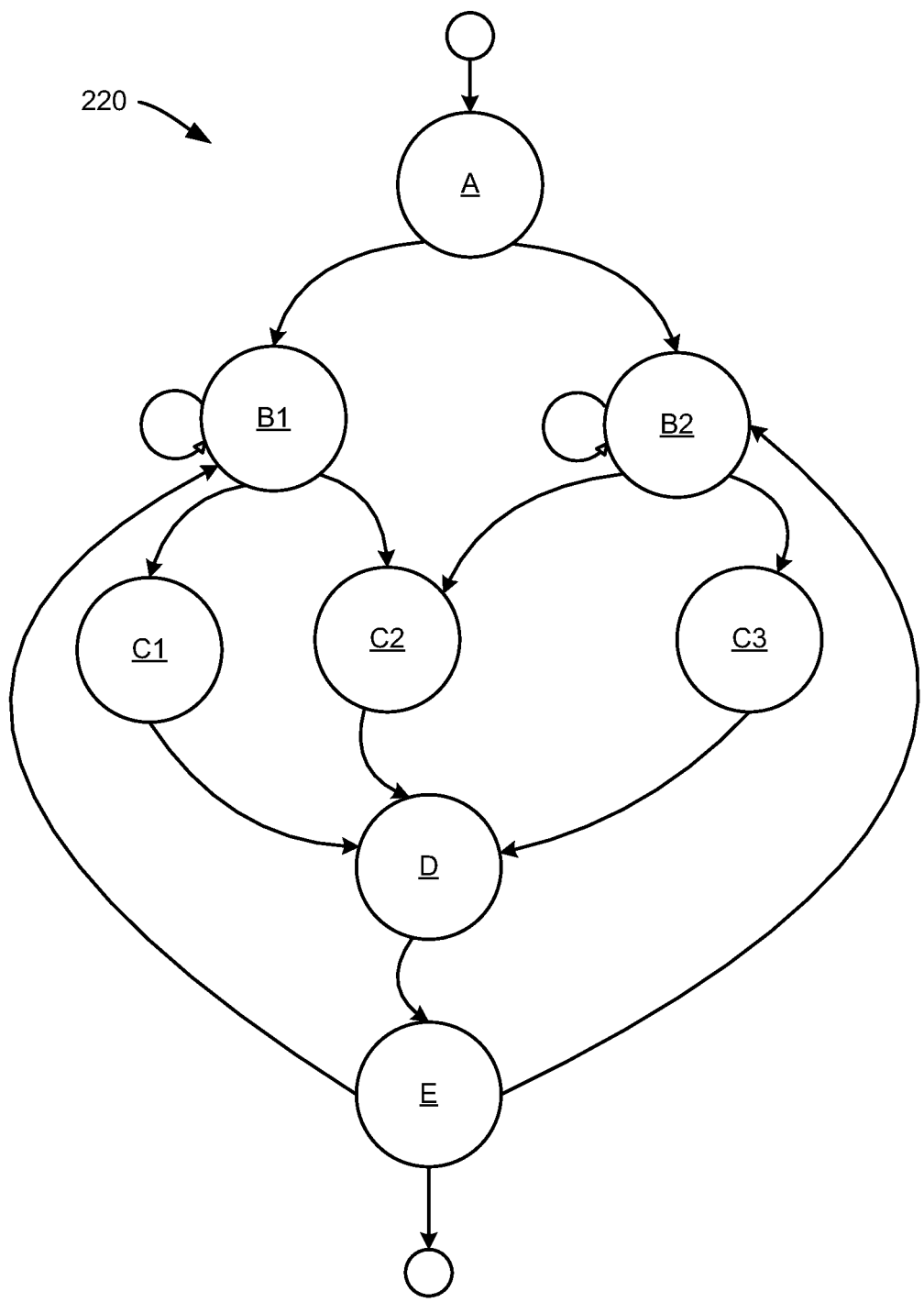
FIG. 2 is an example state diagram exemplifying a media state machine representing different states of content segments and possible transitions to other states to provide a content presentation having non-linear paths for different clients, according to one or more example implementations.

FIG. 2 shows an example video represented as a state machine 220 having states A, B1, B2, C1, C2, C3, D and E, with each state corresponding to a period of one or more video segments. The transitions/conditions are not labeled in FIG. 2 for purposes of clarity, but some possible example transition explanations are set forth below. Further, segment identifiers (e.g., references to manifest files or to segment offset values within a larger file) are not shown in FIG. 2, but are included in or otherwise associated with each node (as also represented in FIG. 3).

As one example, state A may be a pre-roll that every viewer sees, e.g., showing segments comprising the content provider's logo, a copyright warning, and so on. State A conditionally transitions to state B1 or state B2 based upon some criterion (or multiple criteria such as condition X AND condition Y) being met. As can be seen, state B1 can repeat, transition to state C1 or transition to state C2, while state B2 can repeat, transition to state C2 or transition to state C3. States C1, C2 and C3 each transition to state D, and state D transitions to state E. In this example, state E may be a "sneak peek" showing one or more scenes from the next episode in a television series.

One way in which the various conditions may be maintained and evaluated is by rules associated with or contained in states (nodes), e.g., information associated with each state that represent transition rules. For example, state A can be represented by a node that includes representations of the edges to states B1 and B2 as well as including the rules for transitioning to state B1 or state B2, and so on. The state/node also may include or be otherwise associated with (e.g., via a reference) the segment identifiers corresponding to the state, e.g., in one or more periods.

Thus, such states may be represented by/maintained as nodes in a graph, with the transitions represented by edges and transition rules specifying to a rule engine or the like which edge to take. FIG. 3 shows an example set 330 of nodes 331-338 corresponding to the state machine 220 of FIG. 2, in which the information contained in each node is shown in a simplified, human readable form for purposes of explanation.

Thus, in FIG. 3 node A 331 includes edges comprising pointers to nodes B1 and B2, with a rule specifying one or more criteria for taking one of the edges. There may be multiple rules with a node. Rules may be as complex as desired, and if a rule is large or shared among many nodes, a rule may be represented by a reference to a file or other suitable data structure that contains the rule, rather than include the rule information in a node. Having an external file for a rule or set of rules also allows changing the rules without changing individual state machines/nodes; e.g., if a rule is used (or may be used) in many nodes, the rule may be contained in a file referenced by each node so that a single rule change may be made in its rule file and thereby affect any nodes that use the rule.

The node A 331 also contains a period comprising contiguous segment identifiers (although multiple periods may be contained, such as for non-contiguous segments). For example, segment identifiers may reference manifest files, with each file representing a segment (or multiple segments), or the identifiers may be values of offsets within a file containing multiple segments. A period in a node also may comprise a reference to a file or other data structure that contains the segment identifiers. In one or more implementations, a period basically may be considered part of a period "manifest file" that references one or more segment manifests; an entire video (including different paths) may be considered a "manifest" of such manifests. Note that if a file of segment offsets is used, such offsets may be associated with references to different files, e.g., episode one of a series may be contained in one file with its corresponding segment offsets, while episode two of the series (used as part of the same video for episode one to provide a sneak peek preview) may be contained in another file with its corresponding segment offsets.

In the example of FIG. 3, state A (node 331) transitions to state B1 if, based upon the viewer's local time (e.g., evaluated at the end of state A's period playback), it is before noon, it is a weekend or it is a holiday (which may be an external flag that is checked). Otherwise state A transitions to state B2.

In this example, states B1 and B2 (nodes 332 and 333) each play different background content (e.g., different cinemagraphs) in a loop awaiting user input of "Yes" or "No" to some selection choice presented to the user, e.g., presented via text and/or interactive icons superimposed over the background content being played (corresponding to B1's or B2's segments). A "Yes" answer in state B1 transitions to state C1 (node 334), a "Yes" answer in state B2 transitions to state C3 (node 336), and a "No" answer at either state B1 or state B2 transitions to state C2 (node 335). States C1, C2 and C3 each transition to state D (node 337), and state D transitions to state E (node 338). Note that any looping video may be a finite loop which, for example, ends based upon time or some number of repetitions, e.g., to transition to another video such as a screen saver state until some user interaction takes place, or occasionally change to a different video and so on until an answer is received. One or more other rules (not shown in FIG. 3) can be used to control the looping operations.

Note that periods may overlap, e.g., node 335 has some segments in common with node 336, whereby part of the video during playback is the same in each state. If such overlap is not desired, it is feasible to insert one or more nodes that share the same video segments into the graph/state machine so that the content playback is the same for those nodes/states. Further, nodes may have different playback time durations, and thus the playback lengths of some content may differ depending on which path(s) are taken. Still further a node may have multiple periods, e.g., the node 338 contains two non-contiguous periods, such as to represent two distinct sneak peek scenes from next week's television series.

Figure 4:
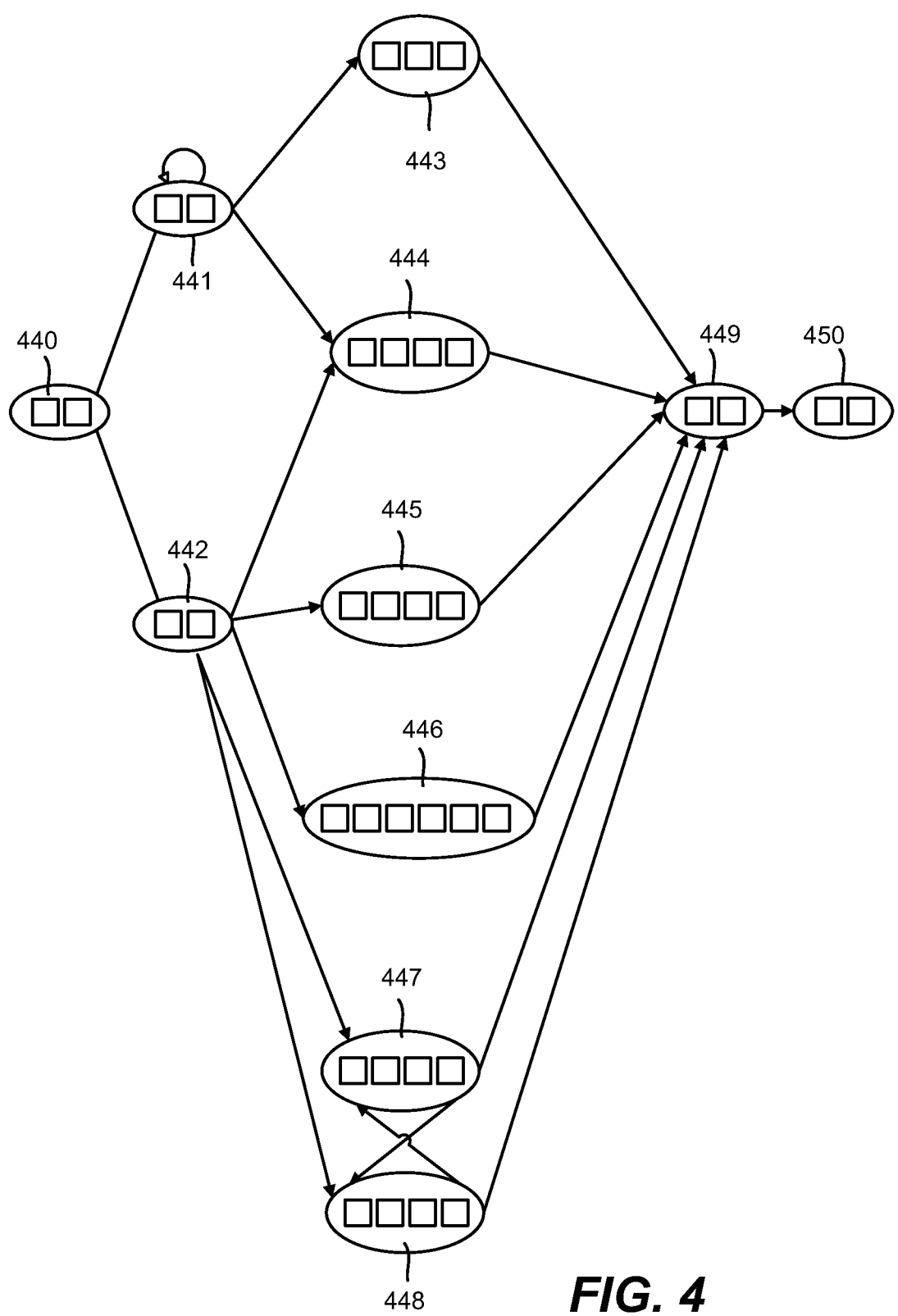
FIG. 4 is an example state diagram exemplifying a media state machine representing different states of content segments and possible transitions to other states to provide a content presentation having non-linear paths for different clients, according to one or more example implementations.

A state machine may be as complex as desired by its author, e.g., the content provider. FIG. 4 shows a number of states 440-450, each corresponding to one or more segments (or periods), as generally represented by the circles therein. Each state also has at least one transition in and one transition out, as represented by the arrows; (the state 440 has an implied transition in from some menu item or the like that starts the video, and the state 450 has an implied transition out to some interactive menu or the like that appears after the video ends). Note that with non-linear media as described herein, a user may pause the media during play, fast forward and rewind between segments (including different states) and end play at any time as with conventional linear media.

It should be noted, however, that streaming content need never end. Instead, a state machine may loop around and never come to completion (unless, for example, the user interacts to stop it). For example, instead of state 450 of FIG. 4 having an implied transition out to some ending point, the exemplified state 450 may loop back to another one of the states 440-449 or even to itself. Note further that the exemplified state 450 may have multiple transition paths to loop back to different states, and/or may have one or more conditional paths that loop back, along with a conditional path that transitions out to some ending point. Another of the states also may transition out of the streaming content to some ending point; for example state 444 may transition to state 449 if entered via state 441 or state 442, but if state 444 is transitioned into by looping back from state 450, state 444 may transition out of the video instead of transitioning to state 449.

In FIG. 4, among the various example states and transitions that provide the numerous possible paths, it is seen that the state 442 has five possible transition paths out from it, while the state 449 has six transition paths into it. Again, any suitable criterion or criteria, including user input, may be used to select a conditional transition path over any other or others.

Moreover, FIG. 4 exemplifies another concept in which the video of state 447 is able to be played before the video of the state 449, or after it. As with other decisions, the order may be based upon one or more criteria, including user input. By way of a previous example, if a viewer has indicated a preference for viewing the castle invasion from the attackers' viewpoint over the defenders' viewpoint, instead of choosing one or the other, both may be shown, in an order that is chosen based upon the viewer's preference (and/or any other suitable criteria). Thus, a viewer X may see a scene filmed from the attackers' viewpoint before seeing the scene filmed from the defenders' viewpoint, while a viewer Y may see these scenes in the opposite order; state 442 may include the transition rule for this path decision. Per-viewer data may be maintained in the system as to whether the other scene (state) was played yet; e.g., a rule for state 447 may be something like "if state 448 has not been played, then transition to state 448 else transition to state 449." Similarly, a rule for state 448 may be something like "if state 447 has not been played, then transition to state 447 else transition to state 449."

Figure 5:
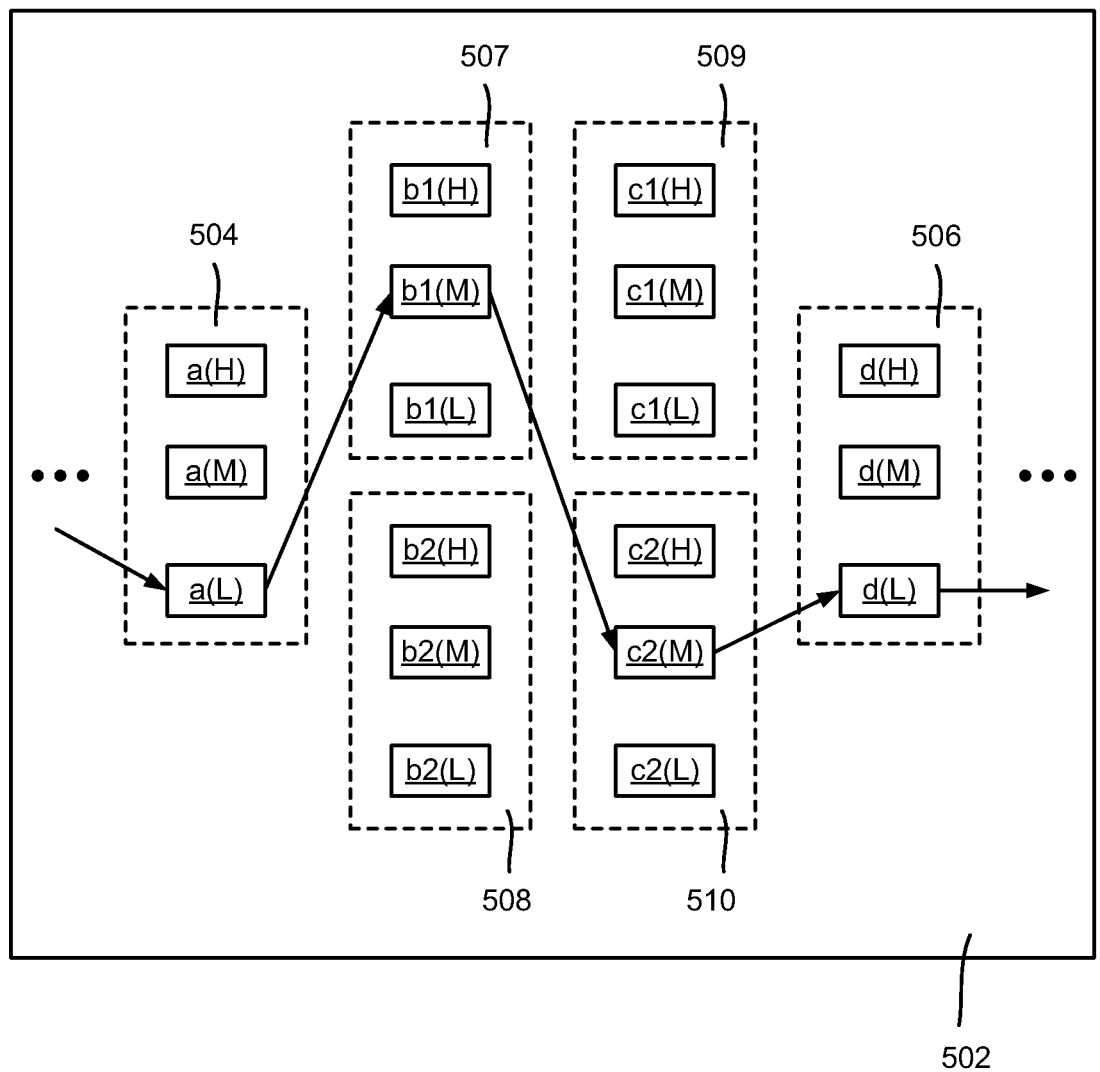
FIG. 5 is an example representation of how different content states may be combined with adaptive resolution segment selection and transmission, according to one or more example implementations.

Turning to another aspect, FIG. 5 shows how a video state machine remains compatible with conventional adaptive bitrate streaming. Any video segment (or period of segments) can, for example, have high, medium and low bitrate (corresponding to resolution/quality) adaptations encoded for them. For example, although not shown, each segment represented by a "square" in FIG. 4 may represent a segment that may have multiple (high, medium and low) quality adaptations encoded therefor.

In the example of FIG. 5, for some video content 502, segment "a" 504 has been encoded into high a(H), medium a(M) and low a(L) resolution/bitrate adaptations, and similarly with segment "d" 506 which has high d(H), medium d(M) and low d(L) resolution/bitrate adaptations. There are two transitions possible from the "a" group of adaptations 504, namely to a "b1" group 507 and a "b2" group 508, each of which similarly have high (b1(H) or b2(H)), medium (b1(M) or b2(M)) and low (b1(L) or b2(L)) adaptations. There are also two transitions possible from each of the "b1" or "b2" group of adaptations 507 and 508 respectively, namely to a "c1" group of adaptations 509 and a "c2" group of adaptations 510, each of which similarly have high (c1(H) or c2(H)), medium (c1(M) or c2(M)) and low (c1(L) or c2(L)) adaptations.

Based upon one or more criteria applied to the state machine, a path is chosen (generally represented via the arrows) in which the group "a" 504 transitions to the group "b1" 507 which transitions to the group "c2" 510 and then to group "d" 506 and so on. Before streaming any segment, an appropriate one of the adaptations from the group in the path to be sent is selected by adaptive bitrate streaming technology based upon the desired bitrate. Thus, in the example of FIG. 5, adaptations a(L), b1(M), c2(M) and d(L) are sent. Note that it is feasible to adapt for a multiple (e.g., two or more) sequential segments, e.g., send two medium quality adaptations in a row rather than select each individual adaptation's quality.

As set forth above, many times the criteria for selecting one transition instead of another is known in advance. However, user input or live social media (and/or possibly a yet-unknown transition time) may be used as (at least part of) selection criteria, which means that the path is not necessarily known in advance. As a result, it is not straightforward to send segments to buffer in such uncertain path scenarios, because which path of segments to buffer is not yet known. For example, consider that in FIG. 6, there are a number (e.g., three) uncertain segment paths represented by block 660, one path of which is to be selected based upon selection criteria not yet known.

To provide for buffering with unknown segments, a multiple path buffering scheme/mechanism may be used, (provided sufficient bandwidth is available). To this end, the content source includes a source-side multiple path buffering mechanism, including an uncertain segment list/buffer build mechanism 662 (FIG. 6) for selecting and transmitting segments from the alternative uncertain paths from the source, (e.g., CDN), using a differentiation scheme that indicates to the receiving client(s) with which one of the paths each segment is associated. The uncertain segments or references thereto may be maintained in a data structure 664 (e.g., a list or buffer) for sending to client(s) at an appropriate time.

Upon receiving the segments, the client device buffers the segments in a way that allows the client to select segments from one path instead of another once the path becomes certain. Although some buffered segments may be discarded, a client viewer does not have to wait for the buffer to fill after making a choice, but rather continues to playback content (e.g., view a video) once user input is provided. Only if the path decision is not obtained in time may the client experience a pause; the moment a decision is known, the buffered data provides for near instant playback. Note that it is feasible for a decision to be made by default, e.g., if a certain path decision is not provided in time (or within a waiting time); choose one path over another by default.

Figure 7A:
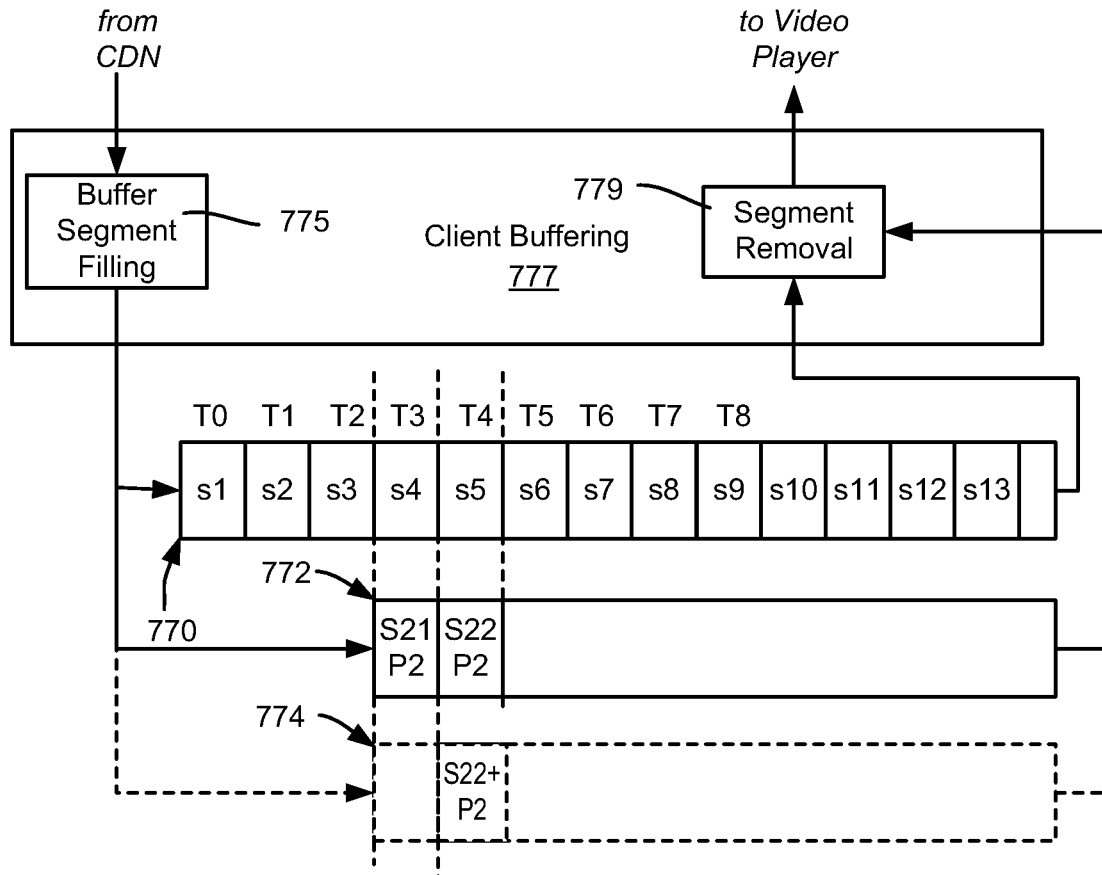
FIG. 7A is an example representation of a client-side multiple path buffering scheme for buffering segments of multiple uncertain paths, in which segment buffering may be based upon probability data for path selection, according to one or more example implementations.

The uncertain segments that are transmitted via the multiple path buffering scheme/mechanism and the order of transmission may be based upon probability. For example, FIG. 7A is an example of one client-side multiple path buffering mechanism, in which there is an eighty percent probability that segment s3 will transition to segment s4, and a twenty percent probability that segment s3 will transition to segment s21. Such probability data may be based upon past user history, past history of other users, user profile data, statistics, heuristics, machine learning and so forth, as well as possibly random, at least to an extent. An alternative to multiple path buffering is to only select the most probable path for segment transmission and make clients wait if they choose a less probable path or paths; however this means some clients have to wait for data.

In the client-side multiple path buffering mechanism of FIG. 7A, assuming the eighty percent/twenty percent chances, for every eight segments (e.g., segments s4-s13) received and buffered in a primary buffer 770 for the eighty percent probability path, two segments are received and buffered in buffer 772 for the twenty percent probability path, e.g., segments s21 and s22; these are differentiated with an indicator "P2" for buffering in the secondary path buffer 772. A buffer segment filling mechanism 775 of a client buffering system 777 contains the logic to handle placing data into such multiple buffers. As can be readily appreciated, (and as previously exemplified in FIG. 6), when there are more than two possible paths, more than two such client-side buffers may be used; e.g., three client-side buffers may be used for sixty percent, thirty percent, ten percent probable path choices.

Such source-side probability-based streaming and client-side buffering may continue until the buffers are full or the path decision is made; note that the lower probability buffer(s) may still continue to be filled (or the ratio may change) as the higher probability buffer becomes full and/or an uncertain path's segments are exhausted, and so on. Once the user (or other) decision is made and the path becomes certain, the multiple probability-based streaming and buffering may conclude and be replaced by single path buffering, with segments in any buffer that corresponds to an unneeded path being discarded.

For path differentiation, the segments may be suitably marked (primary buffered segments may be marked as such or left unmarked as they are the default) by a source-side differentiation mechanism/scheme (part of block 662 in FIG. 6) so that the client device logic knows into which buffer to place each one. When the path becomes known, in FIG. 7A the client buffering 777 (e.g., via segment removal logic 769 that understands multiple buffers) needs to know which buffered segments to use and which to discard, (as well as when to switch buffers if an alternate path is chosen), which may be communicated from the content delivery network (or possibly known because the user interacted via a client program to make the decision). Thus, for example, at T3 (following segment s3), in FIG. 7A the client segment removal logic 779 knows to use either segment s4 or s21 from its respective buffer 770 or 772. The client-side multiple path buffering mechanism 777 continues using that currently selected buffer, both for segment filling and removal, until further notice from the source.

Figure 6:
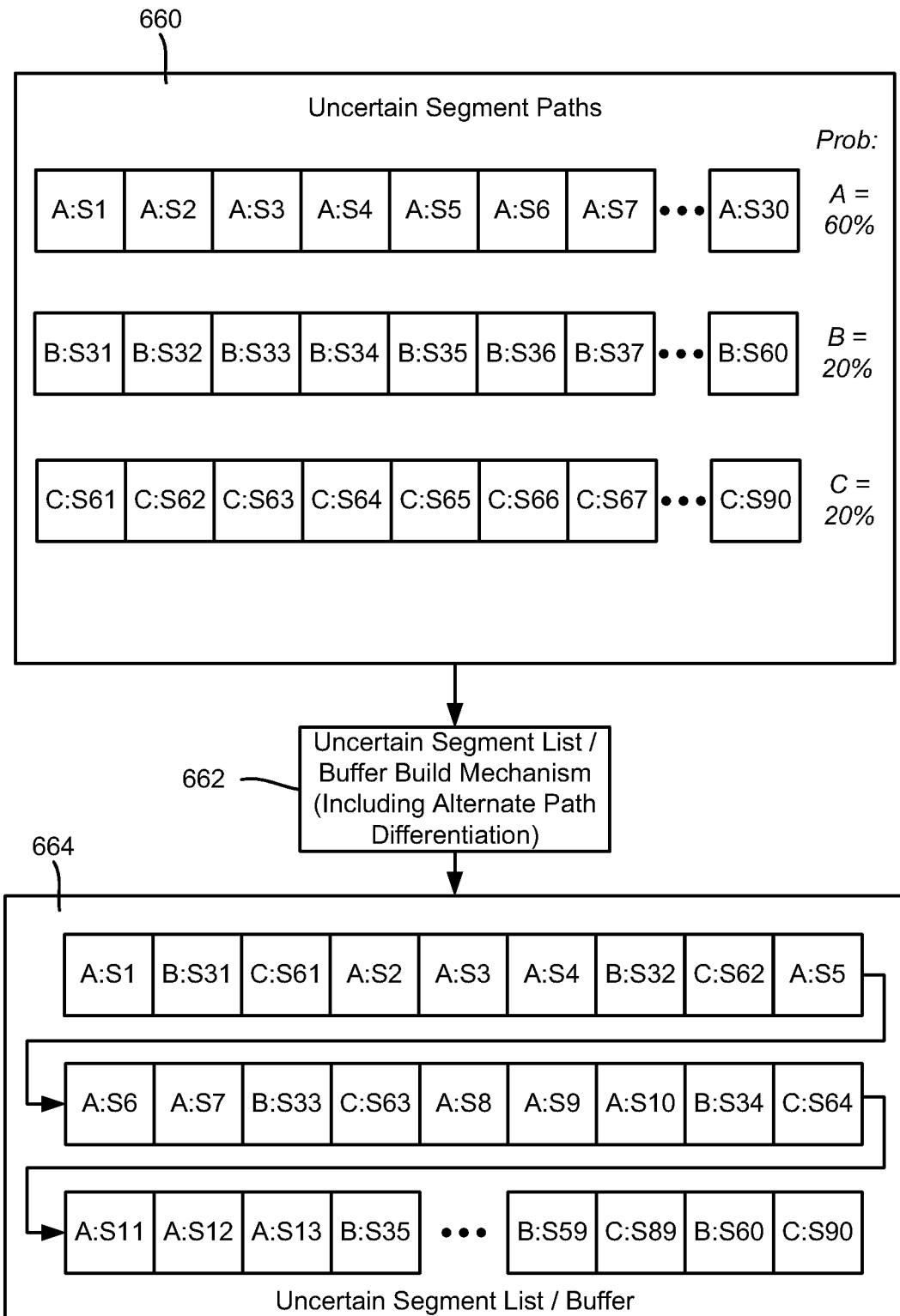
FIG. 6 is an example representation of a server-side multiple path buffering scheme in which uncertain segment paths may be built into a data structure (e.g., list or buffer) of segments to select and transmit for buffering based upon probability data, according to one or more example implementations.
Figure 7B:
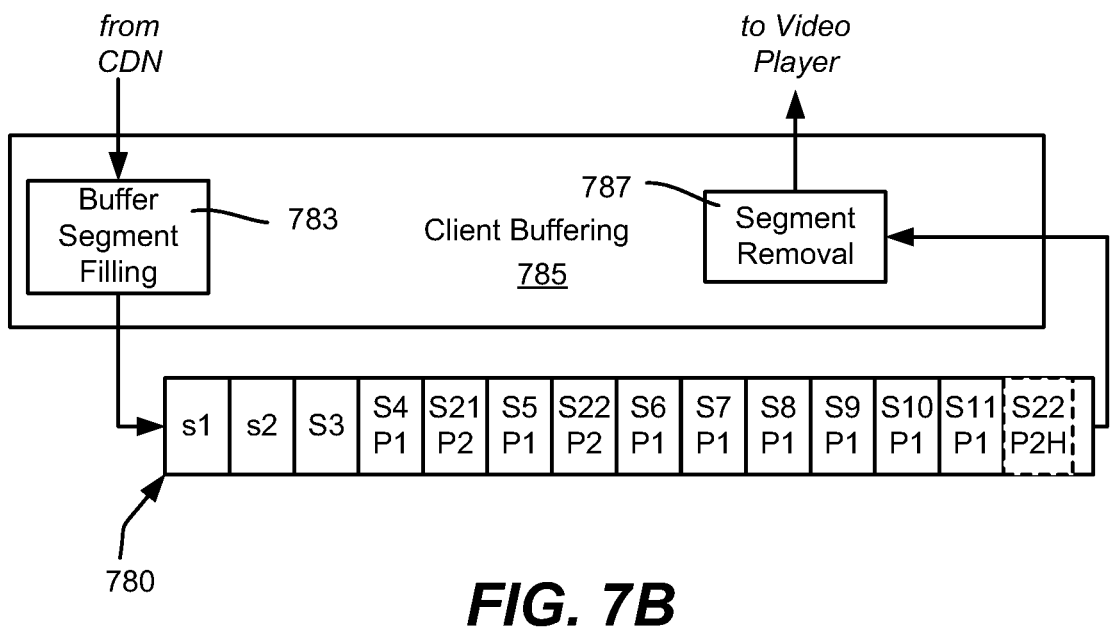
FIG. 7B is an example representation of a client-side multiple path buffering scheme for buffering segments of multiple uncertain paths in a single buffer, in which segment buffering may be based upon probability data for path selection, according to one or more example implementations.

A similar multiple uncertain transition path mechanism is shown in FIG. 7B, using a single buffer 780 along with an indication as to which path (if any) each segment is in, e.g., path P1 or path P2. As in the multiple buffer solution of FIG. 7A, probability data may be used at the content source (FIG. 6) to determine how many segments to send for each path relative to the other path or paths, as well as the order (interleaving of segments from alternative paths) of sending segments, if appropriate. In general, such a buffer may be filled as in any buffered video scenario, e.g., via a buffer segment filling mechanism 783 of a client buffering system 785, which only needs to fill the single buffer 780.

However, unlike conventional linear video buffering, when processing the buffer to select the segments to output the content (e.g., video), the client buffering mechanism 785 needs to know which path has been selected. Thus, in this example since no path information is provided for segments s1 through s3, those segments are simply used as is by a segment removal mechanism 787. Following these segments, alternative path segments are transmitted in interleaved and buffered. Sometime before the alternate path choice is made, e.g., via user input at the client device, the path decision is known by the segment removal mechanism 777 of the client device. Thus, when the segment removal mechanism 777 sees that there is path information P1 associated with segment s4, the client device knows whether this path's segments are to be used or whether they are to be discarded. If path P1 was selected by the user, the segments s4 through s11 are used (and so on if there are more) with segments s21 and s22 discarded as they are processed and evaluated for possible use, because they are not in path P1; (note that path P2 segments are no longer streamed as soon as the content delivery network knows of the user's P1 path decision). Conversely, if path P2 was selected, the segments s4 through s11 are discarded because they are not in path P2, with segments s21 and s22 used; (more P2 segments may be streamed and P1 segment streaming halted as soon as the content delivery network knows of the P2 path decision). Again, more than two paths may be available in the single buffer solution at any time.

Thus, in one or more implementations, when there are uncertain paths, as shown in FIG. 6, a collection of segments comprising a segment list or buffer 664 may be built from the segments of the uncertain paths 660. Such a collection may be based upon probability, if known, (with equal or possibly random probabilities used if there are no probability data available for the multiple paths). To this end, the segments may be listed/buffered for streaming (to one or more client buffers) in the list 664 interleaved according to their respective probabilities. In the example of FIG. 6, it is seen that segment path A is associated with a sixty percent probability, segment path B is associated with a twenty percent probability, and segment path C is associated with a twenty percent probability, whereby the ratio is 60:20:20 or 3:1:1. Thus, for every three segments to be streamed for path A, one segment is to be streamed for path B and one segment for path C. Note that the segment paths may be ordered for processing based upon their respective probabilities, e.g., highest to lowest, however this is only one alternative.

More complex ratios may exist, e.g., 63:29:9, and thus some rounding or percentage multiplying (and then possibly rounding) may be performed so that some segments are sent for each path with a reasonable distribution. Note that the number of segments to interleave may be a factor, e.g., path A may have twenty segments, path B twenty-one, path C twenty-two and path D twenty-nine, whereby the ratio may be approximated and reduced down based on the relative number of segments in each path.

In FIG. 6, uncertain segment list/buffer build (including alternate path differentiation) logic 662 or the like (an example of which is described below with reference to FIGS. 11 and 12) processes the possible paths 660 into the probability-based list/buffer 664. In this example there are thirty segments for path A, [A:S1-A:S30], thirty segments for path B, [B: S31-B:S60] and thirty segments for path C, [C:S61-C:S90]; (however it is understood that these are only examples, and that the number of segments in any path may differ, the segments of one state may overlap with another state or states, and/or the segment numbers in the periods need not be sequential).

In the example of FIG. 6, before starting the probability-based distribution of segment interleaving, one segment from each possible path may be listed (or buffered) at the front of the list. This avoids a situation in which a large probability path lists so many segments that no segments from another path can be buffered before they are needed.

This is only one alternative, and zero, one or even two (or more) segments from each possible path may be listed for buffering before probability-based segment distribution begins. It is also feasible to start listing from the lowest probability segment path(s) first, however this may tend to unnecessarily increase the number of segments that are ultimately discarded once a selection of a formerly uncertain path is made and the path becomes certain.

In FIG. 6, the segments A:S1, B:S31 and C:S61 are listed first, followed by probability-distributed segments, A:S2, A:S3, A:S4, B:S32, C:S62 and so on. When there are no more path A segments to list, only B and C segments are listed.

Whenever there is an uncertain path, such a probability-based list/buffer may be built, which may be when the state machine is established for a video, or anytime up until multiple path streaming is needed. When needed for transmitting segments, the list is accessed and used to stream and buffer segments as described herein, until a path becomes certain or the list is exhausted.

Another alternative for multiple path buffering is to buffer different adaptations, e.g., by distributing the bandwidth proportionally or in some other way based upon probability. For example, consider an eighty percent, twenty percent path probability; segment adaptations from the twenty percent branch (path) may be buffered at twenty percent quality, and those from the eighty percent branch at eighty percent quality. The concepts of quantity of segments per path and quality of adaptations may be combined, such as based upon bandwidth; e.g., instead of a 9:1 segment ratio for ninety percent, ten percent probabilities, an 8:11 ratio with seventy percent quality, forty percent quality, respectively may be used.

Further, once a path is certain and only one set of segments/adaptations are to be used, multiple path buffering includes the ability to 'upgrade' previously downloaded low quality segments with higher quality segments. For example, in FIG. 7A, consider that path P2 has become certain and thus segment removal 779 is using the buffer 772; a third buffer 774 (shown dashed as a possible path) may begin being filled with higher quality adaptations for path P2 and the client instructed to upgrade to those segments by switching to use that buffer 774, e.g., at some segment S22+ (where '+' indicates higher quality).

For upgrading quality in the scheme of FIG. 7B, an adaptation identifier (e.g., "H" for high) as well as a path identifier may be used to upgrade segments, e.g., by instructing the client (following segment S21 of path P2) to use downloaded segments marked P2, adaptation "high" (or "H") and discard others including P2 segments without "high" adaptations. An example is represented in the buffer 780 of FIG. 7B by the segment S22 of path P2H in the dashed box. Another segment adaptation quality upgrade option for the scheme of FIG. 7B is to download segment adaptations for a new "path" (e.g., P3) that is really path P2's segments with a different adaptation, and instruct the client to begin using that new "path" P3 and discard other segments.

Figure 8:
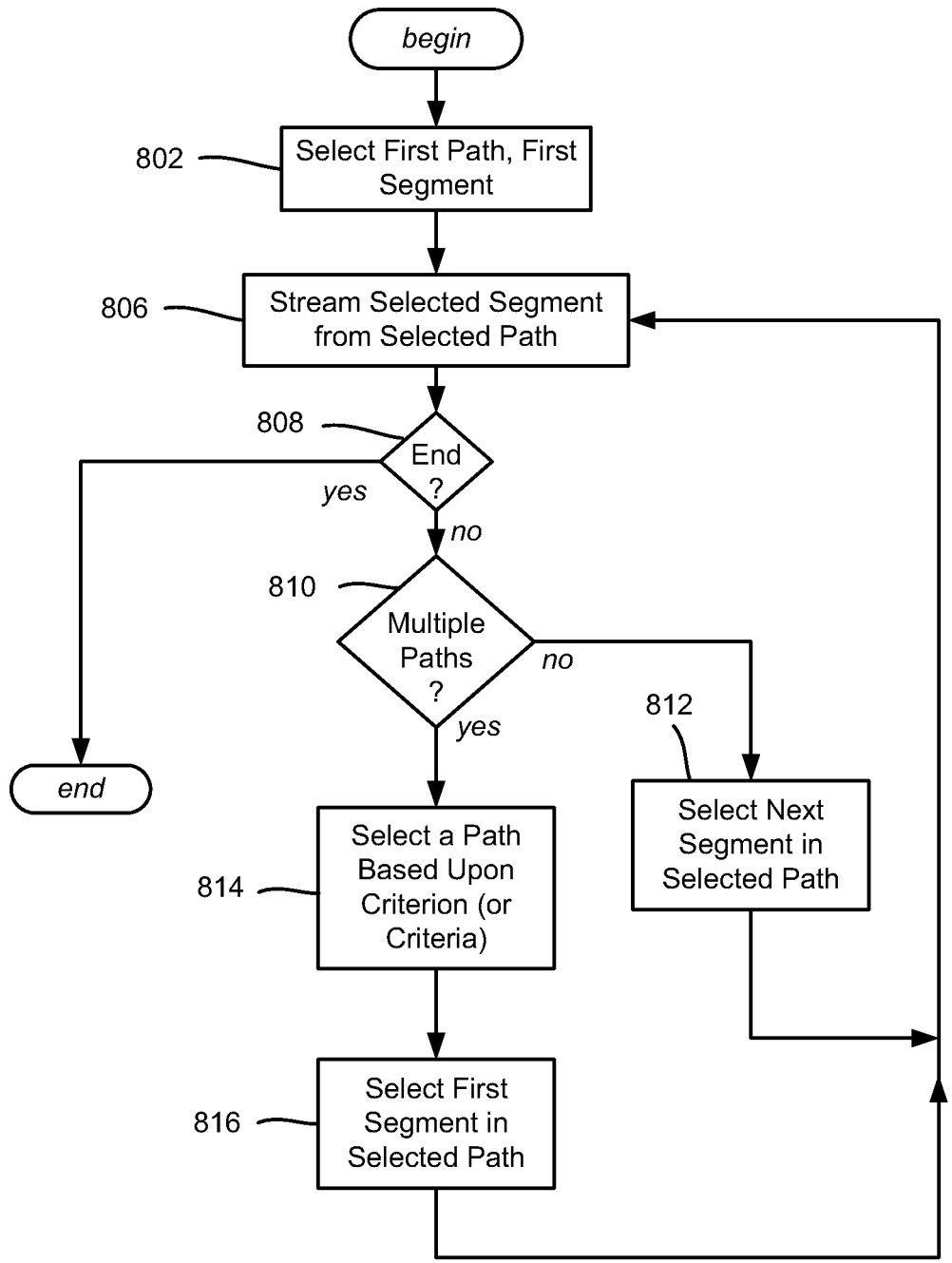
FIG. 8 is a flow diagram showing example logic/steps that may be taken to stream segments of content when different paths are available and chosen according to one or more selection criteria, according to one or more example implementations.

FIG. 8 is a flow diagram showing example steps/logic that may be used to determine which content segments to send for a piece of content having multiple possible content paths (of states and transitions between them). FIG. 8 is generally simplified in that each of the criterion/criteria is known for a client in advance, and thus the path for that client is certain, that is, there is no dynamically user input/social media/time-dependent selection data or the like that are received or occur during playback that would result in one or more uncertain paths. FIG. 8 also assumes that initially there is a single starting stream path, although it is straightforward to select a path from among multiple paths before the first segment is streamed, (e.g., by generally starting at step 810, described below).

Step 802 selects the first segment to send from the first stream path, that is, the single starting path in this example. Step 806 streams the path, which may be directly to a client, or alternatively to a file or the like being set up for streaming to a client; (as another option, segment identifiers instead of actual segments may be streamed to a file). Step 808 evaluates whether the segment is the last segment to stream, (none remain), so that the streaming ends appropriately; (in this example, at this time the end is not yet reached).

Step 810 evaluates whether there are multiple paths available after the just-streamed segment. If not, step 810 branches to step 812, which selects the next segment in the current path, and which, for example, may be a segment in the same period as the just-streamed segment. This next segment is streamed by returning to step 806, and so on.

If instead there are multiple possible paths at step 810, step 814 selects one path from those available to take based upon the transition condition (rule or rules) and the selection criterion or criteria that decides the transition condition. The first segment of this next path is selected at step 816 and is streamed by returning to step 806, and so on.

Figure 9:
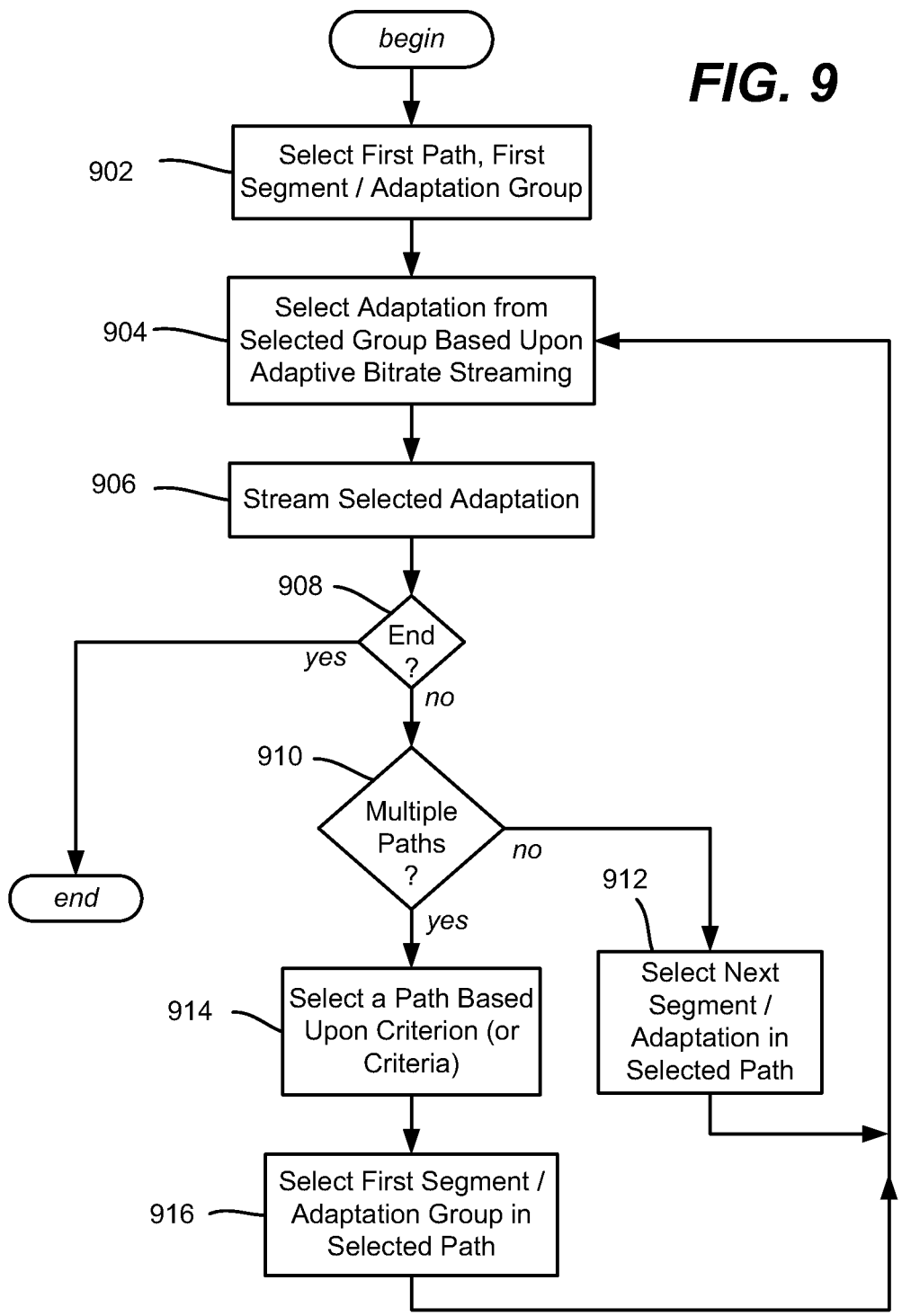
FIG. 9 is a flow diagram showing example logic/steps that may be taken to stream segments of content when different paths are available and chosen according to one or more selection criteria, and in which adaptive bitrate streaming chooses segment resolution, according to one or more example implementations.

FIG. 9 is a flow diagram showing steps/logic that may be used to determine which content segments to stream for a piece of content having multiple content paths (of states and transitions). FIG. 9 is similar to FIG. 8, except that adaptive bitrate streaming is considered, (and thus the streaming is to a viewer device rather than a file).

With multiple content paths and adaptive bitrate streaming, instead of selecting the next segment in the selected path, a next group of segment adaptations is selected, e.g., with the group comprising high, medium and low bitrate adaptations of the same content; (step 902 assumes a single starting group). From this adaptation group, one of the bitrate-encoded adaptations is selected (step 904) for streaming at step 906.

As can be seen, adaptive bitrate streaming need not have knowledge of multiple paths, and thus may be basically unchanged, as each different path has a group of bitrate-encoded adaptations. Groups are provided for each segment adaptation (step 912) and so on. When multiple paths are detected (step 910) and one of those paths is selected (step 914), that path's first group of (e.g., three) bitrate-encoded adaptations is selected (step 916) and provided for bitrate-based segment selection (step 904), and so on with the next group in the path (step 912), as if there was a single linear path through the video content. Thus, the concept of a state machine with multiple paths may be entirely transparent to the logic that performs bitrate-based adaptation selection in one or more implementations. Notwithstanding, it is feasible to have an alternate technology in which adaptive bitrate streaming-like logic is aware of multiple, differing content paths. For example, adaptive bitrate streaming-like logic may recognize that probability-based multiple segments/adaptations are being sent, (for uncertain path buffering), which may influence bitrate selection; e.g., because two or more adaptations need to be streamed for each one adaptation that is actually to be viewed.

Figure 10:
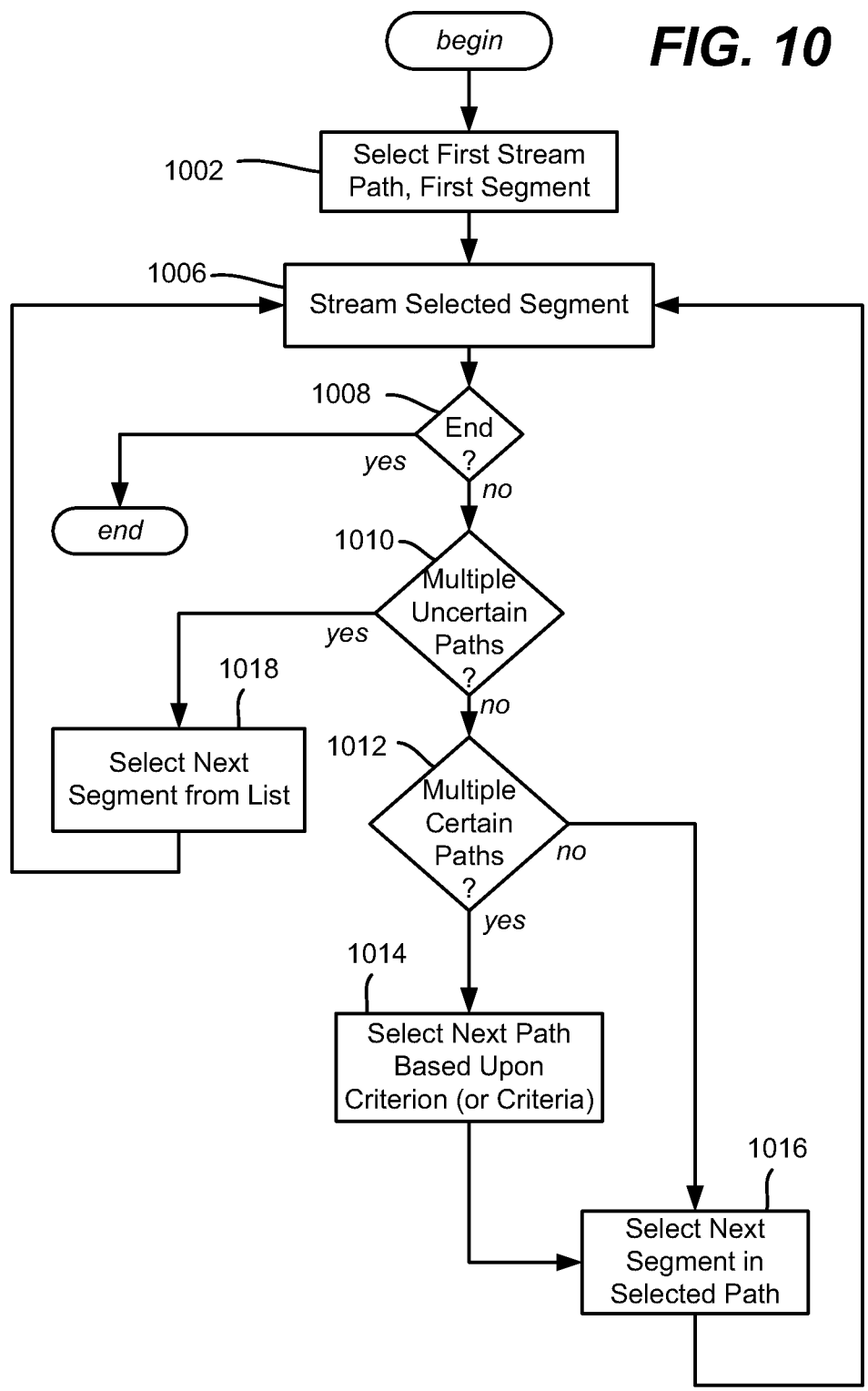
FIG. 10 is a flow diagram showing example logic/steps that may be taken to stream segments of content when different paths are available and chosen according to one or more selection criteria, including when uncertain paths may be taken based upon one or more selection criteria that are not yet known, according to one or more example implementations.

FIG. 10 is a flow diagram showing example logic/steps related to streaming content when there may be one or more uncertain paths. For purposes of clarity adaptive bitrate streaming is not shown in FIG. 10; (as can be readily appreciated, adaptive bitrate streaming is straightforward to implement by using groups of bitrate-differentiated adaptations instead of single segments).

FIG. 10 assumes that initially there is a single starting stream path, although it is straightforward to select one path (or uncertain paths) from among multiple paths before the first segment is streamed. Step 1002 selects the first segment to send from the first stream path, that is, the single starting path in this example. Step 1006 streams the path, which may be directly to a client, or alternatively to a file or the like being set up for streaming to a client; (as another option, segment identifiers instead of actual segments may be streamed to a file). Step 1008 evaluates whether the segment is the last segment to stream, (none remain), so that the streaming ends appropriately; (in this example, at this time the end is not yet reached).

Step 1010 evaluates whether there are multiple uncertain paths available following the just-streamed segment. If not, step 1010 branches to step 1012, which evaluates whether there are multiple certain paths available following the just-streamed segment. If not, step 1016 selects the next segment in the current path, and which, for example, may be a segment in the same period as the just-streamed segment. This next segment is streamed by returning to step 1006, and so on.

If there are multiple possible paths at step 1012, step 1014 selects one path from those available to take based upon the transition condition (rule or rules) and the selection criterion or criteria that decides the transition condition. The first segment of this next path is selected at step 1016 and is streamed by returning to step 1006, and so on.

Returning to step 1010, consider that there are multiple uncertain paths that may be taken, e.g., because user input or the like is still needed before the next path is decided. As described above, uncertain paths may use a probability-based list or the like to stream segments for the multiple paths into one or more buffers (FIG. 6A or FIG. 6B), with one buffered path of segments used when a decision is obtained.

As described herein with reference to FIG. 7, segments in which the path is still uncertain may be selected (step 1018) for streaming from a probability-based list or the like that was built sometime prior to the state being reached that has the uncertain transitions. Note that it is alternatively feasible to dynamically compute the segments to stream rather than access a list, or to on demand build a list in whole or in part.

Figure 11:
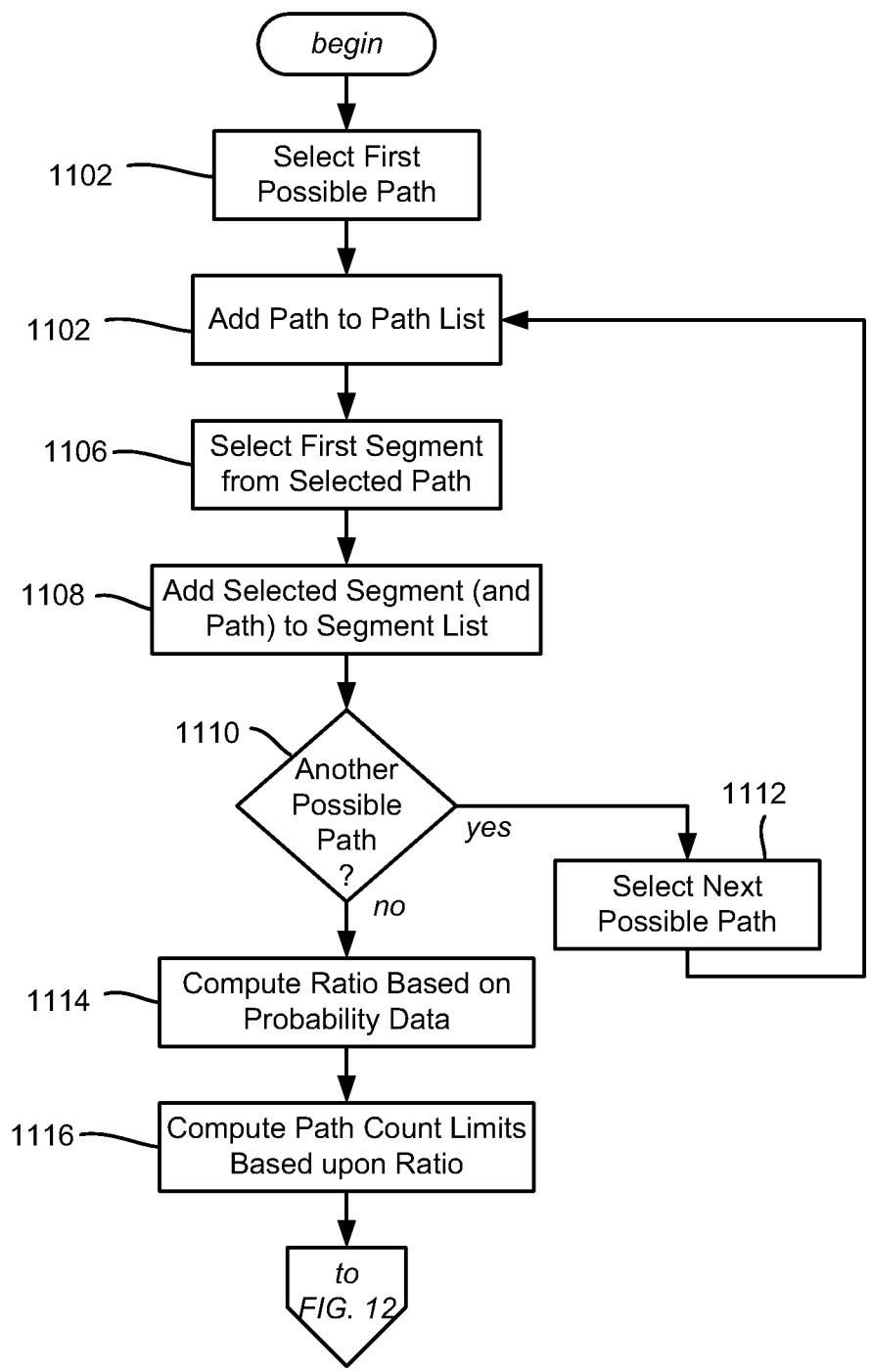
FIGS. 11 and 12 comprise a flow diagram showing example logic/steps that may be taken to build a data structure (e.g., a list or buffer) containing uncertain segments corresponding to interleaved paths of segments in which segment selection may be based upon probability data for taking each uncertain path, according to one or more example implementations.
Figure 12:
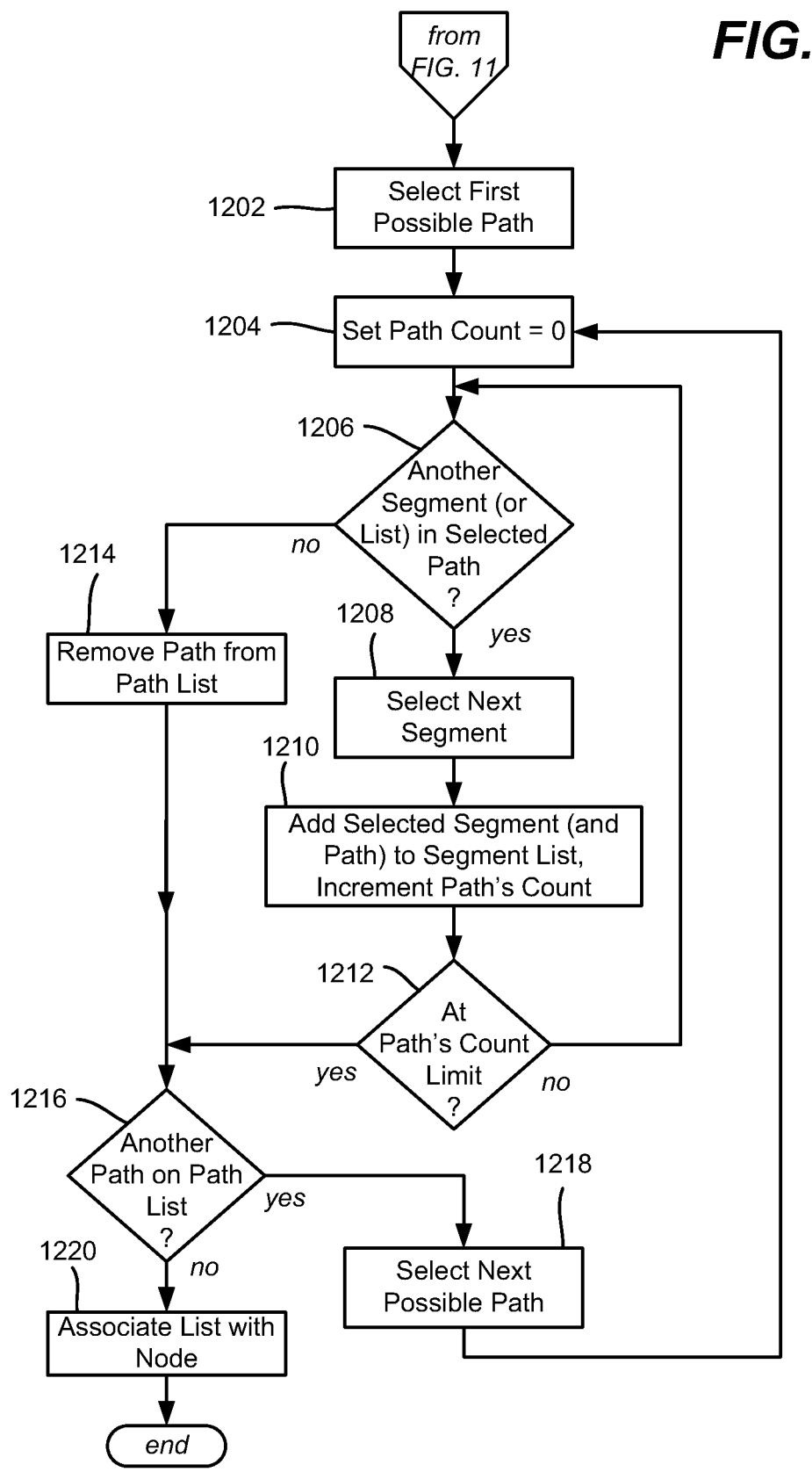

FIGS. 11 and 12 show one way in which a probability-based segment list may be built. In this example, one segment from each possible path is listed for buffering before probability-based listing occurs, e.g., to ensure that at least one segment is to be buffered for each path rather than wait for a (possibly lengthy) path of segments to buffer.

Step 1102 selects a first possible path, which may be based upon probability, or the order listed in the state (node) from which uncertain paths arise, or by any other suitable mechanism including random selection. Step 1102 adds the path to an initially empty list of paths (for use as described below with reference to steps 1214 and 1216 of FIG. 12).

Steps 1106 and 1108 select and add the first segment for the selected path to the segment list. Steps 1110 and 1112 change the path and return to step 1102 until no possible paths remain. In this example, there is now a path list (e.g., paths K1, K2 and K3) with a first segment for each path in the path/segment list (e.g., K1:S130, K2:S240 and K3:S400). As is understood, having one first segment from each uncertain path to start the list is optional, and there may be zero, two or even more if desired for a given set of content.

Step 1114 computes the ratio of segments to list from each path based upon the probability data, if any, for this point of uncertainty. Step 1116 computes the count limits for each path based upon the ratio, which can be an approximation based upon what makes sense given the actual ratio and the number of segments in each possible path. For example, step 1114 may decide the ratio of three paths is 71:19:10, which step 1116 approximates to a segment ratio of 7:2:1 (segment count limits of 7 from a first path, 2 from a next path and 1 from a last path, then repeat). Note that the probability data may be previously approximated into a segment ratio/count limits associated with its state/node, in which event steps 1114 and 1116 are replaced with a lookup of these count limits). The process continues to step 1202 of FIG. 12.

Step 1202 selects the first possible path, e.g., K1, and step 1204 sets the path count to zero. Step 1206 evaluates whether there is another segment in the selected path, because when each of the segments for a selected path are listed, that path is done. At this time, in this example at least one more segment exists for the currently selected path.

Step 1208 selects the next segment, which step 1210 adds to the list; step 1210 also increments the path count. If not yet at the path count limit for this path, step 1212 returns to step 1206 and so on. In this way, for example, using the ratio of 7:2:1 for paths K1, K2 and K3, path K1 has seven segments listed (K1's count limit) for every two segments of K2, and for every one segment of K3.

When the limit is reached, step 1216 determines whether there are more paths having segments to list. If so, step 1218 selects the next path as listed in the path list, and returns to step 1204 to reset the counter for this path.

At some point, a path will have its segments listed and thus have no more segments to list, as determined by step 1206. At that point, step 1214 removes the path from the path list. For example, if paths K1, K2 and K3 each have twenty segments, path K1, which uses seven segments for K2's two segments and K1's one segment has its segments listed, gets its last segment listed well before K2 and K1 have their last segments listed. In one or more implementations, the process continues to use the segments of the remaining paths (steps 1216 and 1218) until each path has each of its segments listed and no paths remain (step 1216). Once built, the list may be associated (step 1220) with the node (state) where the uncertain transitions exist.

Figure 13:
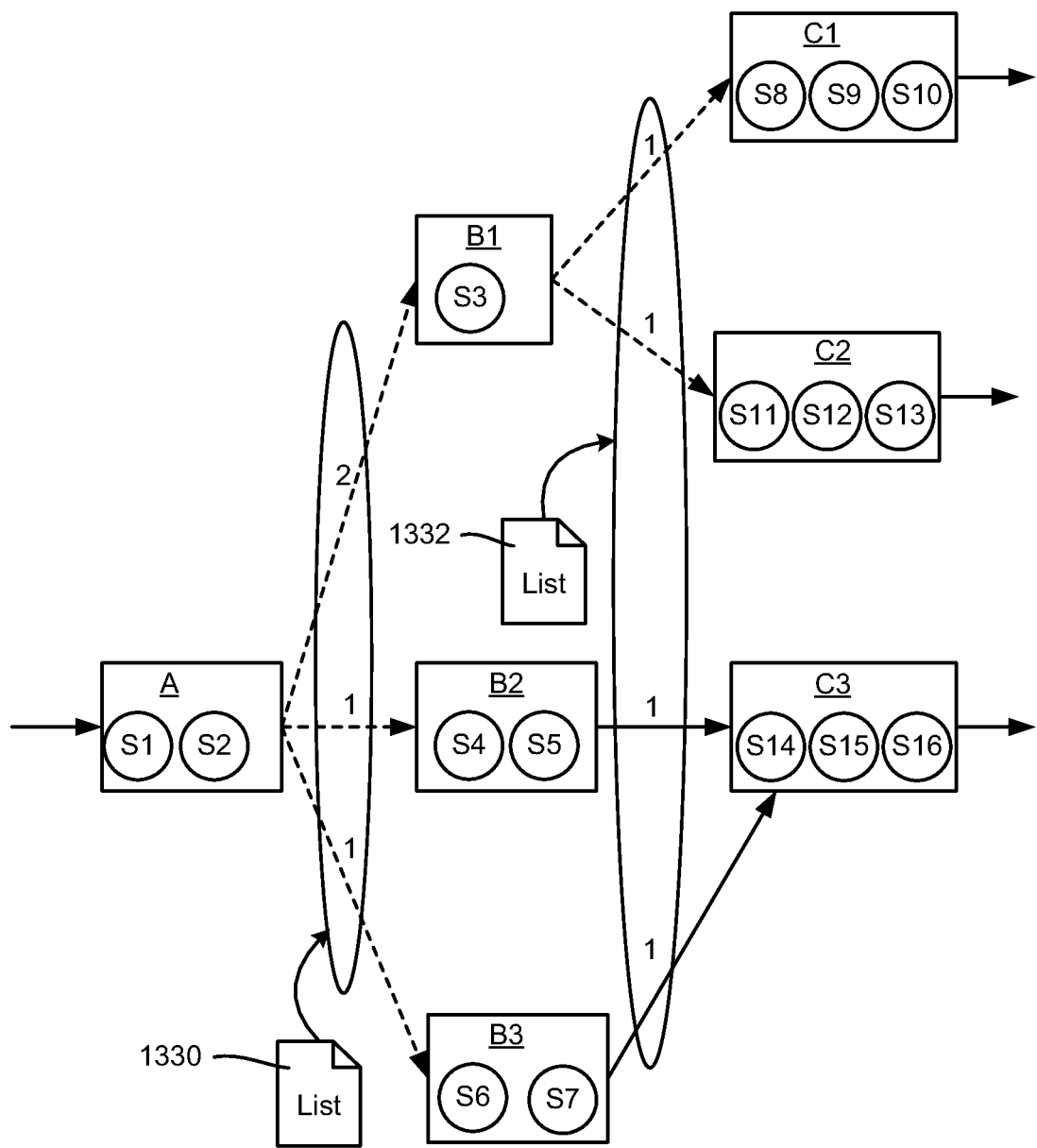
FIG. 13 is an example representation of a content state machine having uncertain transition paths from some states and certain paths from other states, from which segments may be selected for transmission and buffering via a multiple path buffering mechanism, according to one or more example implementations.

FIG. 13 shows a scenario in which the transitions out of a state correspond to three uncertain paths represented by dashed arrows, namely one to a state B1, one to a state B2 and one to a state B3. A data structure (e.g., list/buffer) 1330 associated with these transitions may be built, which are shown (by the numbers in the oval each accompanying a dashed arrow) as having a 2:1:1 segment selection ratio, respectively. Thus, in general as set forth above, for every four segments following state A, two segments are to be selected following the arrow to the state B1, one segment following the arrow to the state B2 and one segment following the arrow to the state B3.

As can be seen in this example, however, the transition out of B1 also has two uncertain paths, namely one uncertain path to state C1 and another uncertain path to state C2, with a 1:1 probability ratio between them. At this transition level, there is also a certain path from state B2 to state C3 and from state B3 to state B3, also with a 1:1 probability ratio; thus, the probability ratio for reaching the state C1's segments, the state C2's segments and the state C3's segments is 1:1:2 (as there are two ways to reach state C3). Thus, another data structure 1332 may be built for these transition probabilities.

Figure 14:
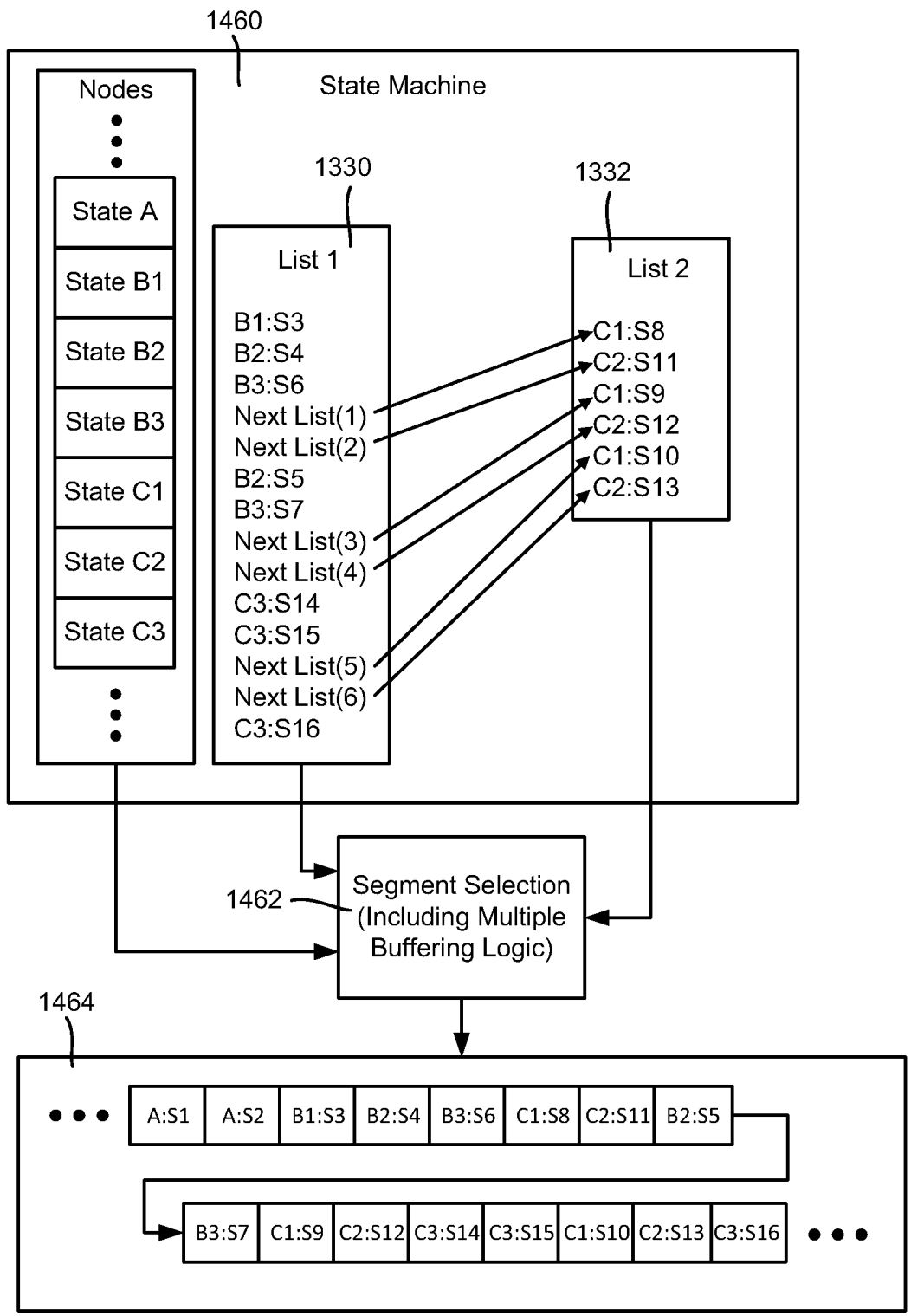
FIG. 14 is an example representation of one way to process the data of states and probability-based segment data structures (e.g., of FIG. 13) to select segments of multiple uncertain paths for transmission and buffering, according to one or more example implementations.

As shown in FIG. 14, the first data structure (e.g., list 1330) associated with the transition out of state A is built with the next segments to send, (including certain and/or uncertain segments), and with references to the next data structure's (list 1332) segments for the next uncertain path. Following selection of a first segment from each next state, B1:S3, B2:S4 and B3:S6, it is seen that the paths out of state B1 are uncertain, and thus reference two segments on the list 1332 (because there is a 2:1:1 probability ratio of taking this path, followed by one next segment from state B2, namely B2:S5, and one next segment from state B3, namely B3:S7. The list 1332 has as its probability-based distribution the first two segments as C1:S8 and C2:S11.

As can be readily appreciated, by building lists that can reference other lists, (and not considering an uncertain path as exhausted at step 1206 if a reference is to another segment in the path, including one in another list), the probability-based segment selection for sending and buffering uncertain segment paths can be used beyond a single point of uncertainty.

Thus, when processing a state machine 1460 for streaming segments, the segment selection logic 1462 (which includes multiple buffering) can select from the state (nodes), and from one or more lists associated with the states. From FIGS. 13 and 14, the selected segments may be the set 1464 comprising [A:S1, A:S2, B1:S3, B2:S4, B3:S6, C1:S8, C2:S11, B2:S5, B3:S7, C1:S9, C2:S12, C3:S14, C3:S15, C1:S10, C2:S13, C3:S16].

As can be seen, described herein is a technology that provides for multiple paths through streamed content such as a video. Selection of one of the paths may be based upon one or more criteria, and/or segments corresponding to unknown paths may be selected and streamed for buffering via a multiple path buffering mechanism. The content may be represented as a state machine of states (corresponding to periods of one or more segments) and transitions to other states.

One or more aspects are directed towards streaming content having different content paths through the content to different clients, including having a plurality of transition paths from one content period to a plurality of next content periods. One or more criteria are used to determine which transition path to a next content period to select as a selected next content period for a client. Segments are transmitted from the one content period and the selected next content period to the client.

The one or more criteria that determine which transition path to a next content period to select may be based upon accessing state data, accessing client-specific data, accessing client-profile data. Using the one or more criteria may include obtaining data from at least one social media source, and/or obtaining client input data from the client.

The plurality of transition paths from the one content period to a plurality of next content periods may be uncertain until the one or more criteria are obtained that determine which transition path to a next content period to select. Selecting a plurality of segments from a plurality of uncertain transition paths may include differentiating which segments are in which path, and transmitting the segments for the plurality of uncertain transition paths to the client for buffering. Selecting the plurality of segments from the plurality of uncertain transition paths may include using probability data associated with each path to select one or more segments from each path based at least in part on the probability data associated with each path. A data structure may be built containing interleaved periods for the uncertain paths, in which the periods are interleaved based at least in part on the probability data associated with each path; selecting the plurality of segments from the plurality of uncertain transition paths may include accessing the data structure.

Having the plurality of transition paths from one content period to the plurality of next content periods may include representing the content as a state machine, including representing the one content period as one state having transitions to other states, with each other state representing one of the plurality of next content periods.

One or more aspects are directed towards a streaming media source that streams media to clients as content segments, including content segments based upon a plurality of different content paths through the content. The content includes at least one content period configured to transition via a plurality of transition paths to a plurality of other, different content periods. The streaming media source, based upon one or more criteria, transitions via one of the plurality of transition paths to select one period to stream to one client and select another of the plurality of transition paths to stream another, different period to another client. For example, the streaming media source may stream audiovisual content, including one path of the audiovisual content to the one client and another, different path of the audiovisual content to the other client.

A multiple path buffering mechanism component may be used at the streaming media source, in which the streaming media source may stream alternative paths comprising different content segments to the one client. The multiple path buffering mechanism at the streaming media source may include a differentiation scheme by which the one client recognizes with which of the alternative paths a content segment is associated. A multiple path buffering mechanism component may be used at the one client, and may include a plurality of client device buffers including a buffer for each alternative path of content segments, buffer segment filling logic that determines based upon the differentiation scheme into which one of the plurality of buffers each content segment is to be buffered, and segment removal logic that obtains content segments from one of the buffers. A multiple path buffering mechanism component may be used at the one client, and may include segment removal logic that determines, based upon the differentiation scheme, whether to select each segment or discard each segment with respect to playing the content.

One or more aspects are directed towards, for a plurality of content segments, selecting a content segment for streaming to a client, streaming the selected content segment to the client and determining whether multiple paths exist for selecting a next content segment. If multiple paths do not exist, a next content period is selected as the selected content segment for streaming to the client. If multiple paths exist, a next content segment corresponding to one of the multiple paths is selected for streaming to the client.

When multiple paths exist, selecting the next content segment corresponding to one of the multiple paths comprises may use one or more criteria to decide from which of the multiple paths to select the next content segment. When multiple paths exist and are uncertain, and selecting the next content segment corresponding to one of the multiple paths may include selecting the next content segment from a collection of uncertain content segments. The collection of uncertain content segments may be built based upon probability data.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 15 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 15:
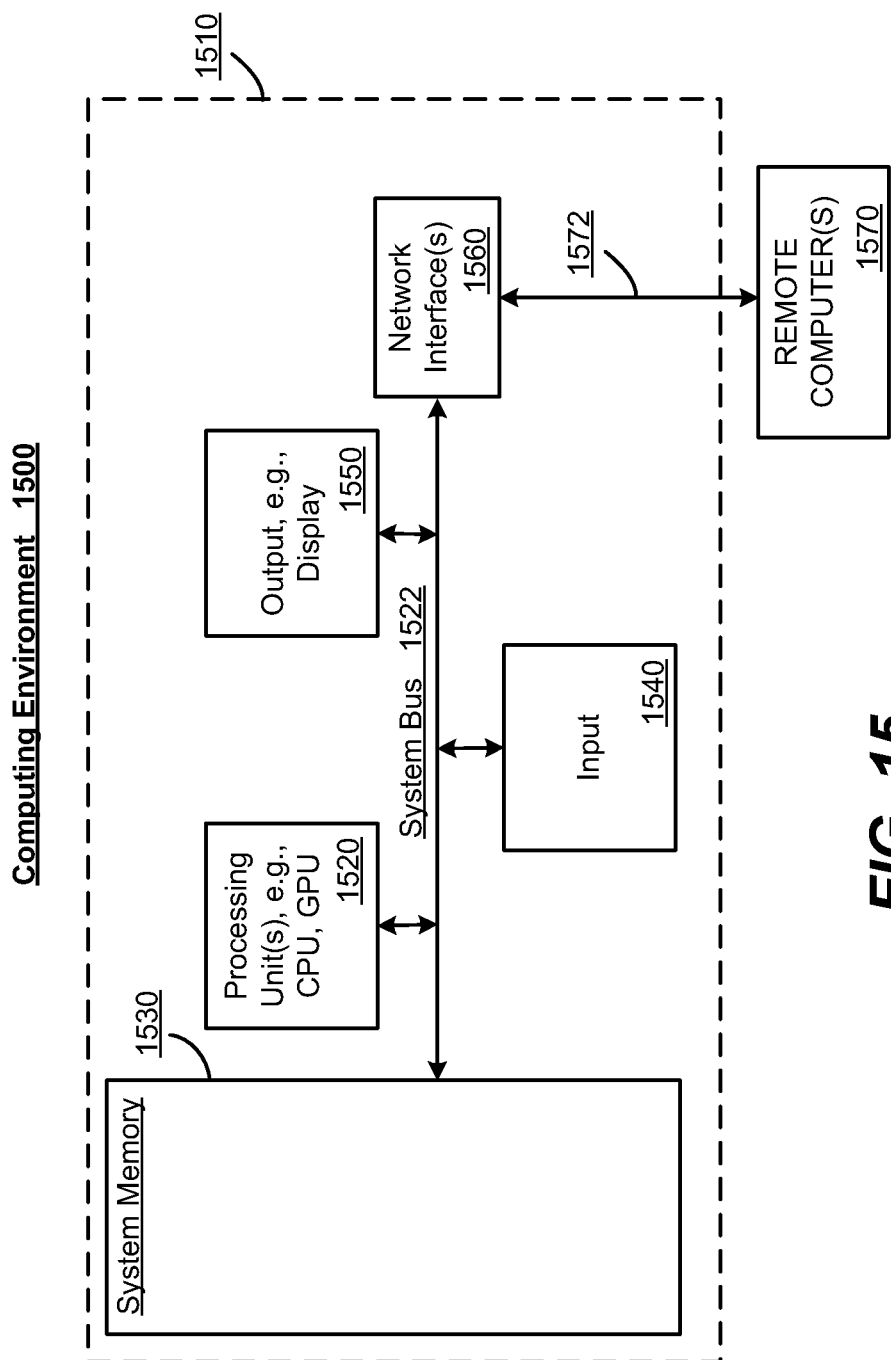
FIG. 15 is a block diagram representing an example computing environment into which aspects of the subject matter described herein may be incorporated.

FIG. 15 thus illustrates an example of a suitable computing system environment 1500 in which one or aspects of the implementations described herein can be implemented, although as made clear above, the computing system environment 1500 is only one example of a suitable computing environment and is not intended to suggest any limitation as to scope of use or functionality. In addition, the computing system environment 1500 is not intended to be interpreted as having any dependency relating to any one or combination of components illustrated in the example computing system environment 1500.

With reference to FIG. 15, an example device for implementing one or more implementations includes a general purpose computing device in the form of a computer 1510. Components of computer 1510 may include, but are not limited to, a processing unit 1520, a system memory 1530, and a system bus 1522 that couples various system components including the system memory to the processing unit 1520.

Computer 1510 typically includes a variety of machine (e.g., computer) readable media and can be any available media that can be accessed by a machine such as the computer 1510. The system memory 1530 may include computer storage media in the form of volatile and/or nonvolatile memory such as read only memory (ROM) and/or random access memory (RAM), and hard drive media, optical storage media, flash media, and so forth. By way of example, and not limitation, system memory 1530 may also include an operating system, application programs, other program modules, and program data.

A user can enter commands and information into the computer 1510 through one or more input devices 1540. A monitor or other type of display device is also connected to the system bus 1522 via an interface, such as output interface 1550. In addition to a monitor, computers can also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor, communicatively coupled to a memory that stores computer-executable instructions, that executes or facilitates execution of the computer-executable instructions to perform operations, the operations comprising:
generating a state machine for video content, the state machine comprising respective nodes representing video content portions of the video content and respective edges representing transition paths between the nodes, the respective nodes comprising transition rules defining conditions for selecting the transition paths, including a node comprising transition paths to a plurality of other nodes;
streaming the video content using different transition paths through the video content based on the state machine, the streaming comprising:
building a set of segments based on the state machine, wherein the set of segments comprises certain segments corresponding to a certain node of the state machine and uncertain segments corresponding to uncertain nodes of the state machine based on the transition rules of the certain node; and
processing the set of segments to select segments for video playback, including to select previously uncertain segments that have become certain based on the transition rules and current condition state data, wherein the current condition state data comprises an indication of whether a client device to which the video content is streamed is moving based on client device motion data.

2. The system of claim 1, wherein the current condition state data further comprises data from at least one social media source.

3. The system of claim 1, wherein the current condition state data further comprises client input data from the client.

4. The system of claim 1, wherein the processing the set of segments to select segments for the video playback current comprises selecting segments from a non-previously traversed transition path based on the current condition state data indicating a previously traversed transition path.

5. The system of claim 1, wherein the current condition state data further comprises age-based rating video content viewing restrictions.

6. The system of claim 1, wherein the current condition state data is determined from client input data.

7. The system of claim 1, wherein the current condition state data further comprises client preference data for a particular genre.

8. The system of claim 1, wherein the operations further comprise, discarding uncertain segments from the set that are not to be selected for playback based on the transition rules and the current condition state data.

9. A method comprising:
generating, by a system comprising a processor, a state machine for streaming video content playback, wherein the state machine has respective nodes representing video content portions of video content and respective edges representing transition paths between the nodes, wherein the respective nodes comprise transition rules defining conditions for selecting the transition paths, and at least one node comprises transition paths to a plurality of other nodes; and
streaming the video content using different transition paths through the video content based on the state machine, the streaming comprising:
buffering a set of content portions, wherein the set contains a respective number of content portions from each path of the different transition paths, and wherein each respective number is proportional to a rounded probability associated with respective corresponding path;
using the transition rules associated with a node representing a currently playing content portion to determine which transition path associated with the node to select for transitioning to a next buffered content period for playback, wherein the transition rules use one or more criteria to determine which transition path to select, wherein the one or more criteria comprises a determination of whether a client device to which the video content is streamed is moving based on client device motion data; and
transmitting data for the next buffered content period for playback.

10. The method of claim 9, further comprising obtaining information corresponding to the one or more criteria from a social media source.

11. The method of claim 9, further comprising obtaining information corresponding to the one or more criteria associated with a client viewer of the streaming video content playback.

12. The method of claim 11, wherein the obtaining the information comprises obtaining client preference data indicating a particular genre.

13. The method of claim 11, wherein the obtaining the information comprises obtaining at least one of client device type data or client device location data.

14. The method of claim 9, further comprising obtaining information corresponding to the one or more criteria from at least one of: past history data or client profile data.

15. The method of claim 9, further comprising obtaining information corresponding to the one or more criteria based on age information of a viewer of the streaming video content playback and age-based rating video content viewing restrictions.

16. The method of claim 9, further comprising obtaining information corresponding to the one or more criteria based on client preference data indicating a desired camera angle.

17. A non-transitory computer-readable medium having instructions stored thereon that, in response to execution, cause a system including a processor to perform operations, the operations comprising:

generating a state machine for a content, wherein the state machine has respective nodes representing content periods of the content and respective edges representing transition paths between the nodes, wherein the respective nodes comprise transition rules defining conditions for selecting the transition paths, and at least one node comprises transition paths to a plurality of other nodes, and wherein the state machine comprises at least one loop amongst one or more nodes; and streaming the content using different transition paths through the content to different clients based on the state machine, the streaming comprising:

buffering a set of content periods, wherein the set contains a respective number of content periods from each path of the different transition paths, and wherein each respective number is proportional to a rounded probability associated with respective corresponding path;

using the transition rules associated with a node representing a currently playing content period to determine which transition path associated with the node to select to transition to a next buffered content period for a client, wherein the transition rules use one or more criteria to determine which transition path to select, wherein the one or more criteria comprises a determination of whether a client to which the video content is streamed is moving based on client device motion data; and transmitting data for the next buffered content period to the client.

18. The non-transitory computer-readable medium of claim 17, wherein the operations further comprise obtaining the one or more criteria based on at least one of: client device type data or client device location data.

19. The non-transitory computer-readable medium of claim 17, wherein the operations further comprise obtaining the one or more criteria based on client input.

20. The non-transitory computer-readable medium of claim 17, wherein the operations further comprise obtaining the one or more criteria based on at least one of: past history data or client profile data.

\* \* \* \* \*